(12) United States Patent
Tosyali et al.

(10) Patent No.: US 12,323,819 B2
(45) Date of Patent: Jun. 3, 2025

(54) KPI-BASED TILT RANGE SELECTION

(71) Applicant: Telefonaktiebolaget LM Ericsson (PUBL), Stockholm (SE)

(72) Inventors: Orkun Tosyali, Alpharetta, GA (US); Christos Neophytou, Highlands Ranch, CO (US); Jose Outes Carnero, Torremolinos (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 648 days.

(21) Appl. No.: 17/628,660

(22) PCT Filed: Sep. 2, 2019

(86) PCT No.: PCT/EP2019/073360
§ 371 (c)(1),
(2) Date: Jan. 20, 2022

(87) PCT Pub. No.: WO2021/013367
PCT Pub. Date: Jan. 28, 2021

(65) Prior Publication Data
US 2022/0256358 A1   Aug. 11, 2022

(30) Foreign Application Priority Data
Jul. 25, 2019   (EP) .................................... 19382638

(51) Int. Cl.
*H04W 16/28*   (2009.01)
*H04W 24/02*   (2009.01)
*H04W 24/08*   (2009.01)

(52) U.S. Cl.
CPC ........... *H04W 16/28* (2013.01); *H04W 24/02* (2013.01); *H04W 24/08* (2013.01)

(58) Field of Classification Search
CPC ...... H04W 16/28; H04W 24/02; H04W 24/08
See application file for complete search history.

(56) References Cited

U.S. PATENT DOCUMENTS

| | | | |
|---|---|---|---|
| 8,385,908 B2 | 2/2013 | Medina et al. | |
| 2012/0028669 A1* | 2/2012 | Ljung | H04W 24/02 |
| | | | 455/517 |

(Continued)

FOREIGN PATENT DOCUMENTS

EP   2219402 A2 *   8/2010   ............ H04W 24/02

OTHER PUBLICATIONS

Yasir Khan et al., Centralized Self-Optimization in LTE-A Using Active Antenna Systems—IEEE 2013.

(Continued)

*Primary Examiner* — Gary Mui
*Assistant Examiner* — Yewon Kim
(74) *Attorney, Agent, or Firm* — Baker Botts L.L.P.

(57) ABSTRACT

A computer-implemented method for determining a tilt range for each cell (300) of a plurality of cells of a wireless cellular telecommunications network, each cell (300) having at least one antenna (20). The method comprises the steps of: for each cell (300) of the plurality of cells, determining a value for each of a plurality of metrics, the plurality of metrics comprising: a metric indicative of retainability, a metric indicative of capacity, a metric indicative of uplink, UL, quality, a metric indicative of downlink, DL, quality, and a cell parameter; determining respective thresholds for each metric; for each cell (300) of the plurality of cells, classifying the cell (300) into one of a plurality of categories based on a comparison of the determined values of the plurality of metrics of the cell (300) to the corresponding thresholds, wherein each category of the plurality of categories has an associated range of tilt values; and determining, for each cell (300) of the plurality of cells, the tilt range for that cell (300) as the range of tilt values associated with the category into which the cell (300) is classified.

18 Claims, 6 Drawing Sheets

(56) References Cited

U.S. PATENT DOCUMENTS

| | | | | |
|---|---|---|---|---|
| 2013/0242736 A1* | 9/2013 | Tarraf | .................... | H04W 24/02 |
| | | | | 370/328 |
| 2016/0162783 A1* | 6/2016 | Tan | ....................... | H04W 24/02 |
| | | | | 706/13 |
| 2016/0165472 A1* | 6/2016 | Gopalakrishnan | .... | H04W 24/10 |
| | | | | 455/67.11 |
| 2019/0215700 A1* | 7/2019 | Sofuoglu | ............... | H04W 24/02 |
| 2022/0248237 A1* | 8/2022 | Hu | ......................... | G06N 3/045 |
| 2023/0066921 A1* | 3/2023 | Vera Nadales | ...... | H04B 17/318 |

OTHER PUBLICATIONS

Johan Johansson et al., Minimization of Drive Tests in 3GPP Release 11, Technology Updates on LTE-Advanced, IEEE Communications Magazine—Nov. 2012.

J. Ramiro and K. Hamied, Self-organizing networks: self-planning, self-optimization and self-healing for GSM, UMTS and LTE, John Wiley & Sons—2011.

Jerawoot Peerajing et al., Multisector Optimization of Antenna Tilt Angle Based Empirical Knowledge from Drive Test—IEEE 2016.

PCT International Search Report issued for International application No. PCT/EP2019/073360—Apr. 1, 2020.

Osman N.C. Yilmaz et al., Self-optimization of Remote Electrical Tilt; 2010 IEEE 21st International Symposium on Personal Indoor and Mobile Radio Communications—2010.

Victor Buenestado et al., Self-tuning of Remote Electrical Tilts Based on Call Traces for Coverage and Capacity Optimization in LTE, IEEE Transaction on Vehicular Technology, vol. 66, No. 5—May 2017.

PCT Written Opinion of the International Searcihng Authority issued for International application No. PCT/EP2019/073360—Apr. 1, 2020.

* cited by examiner

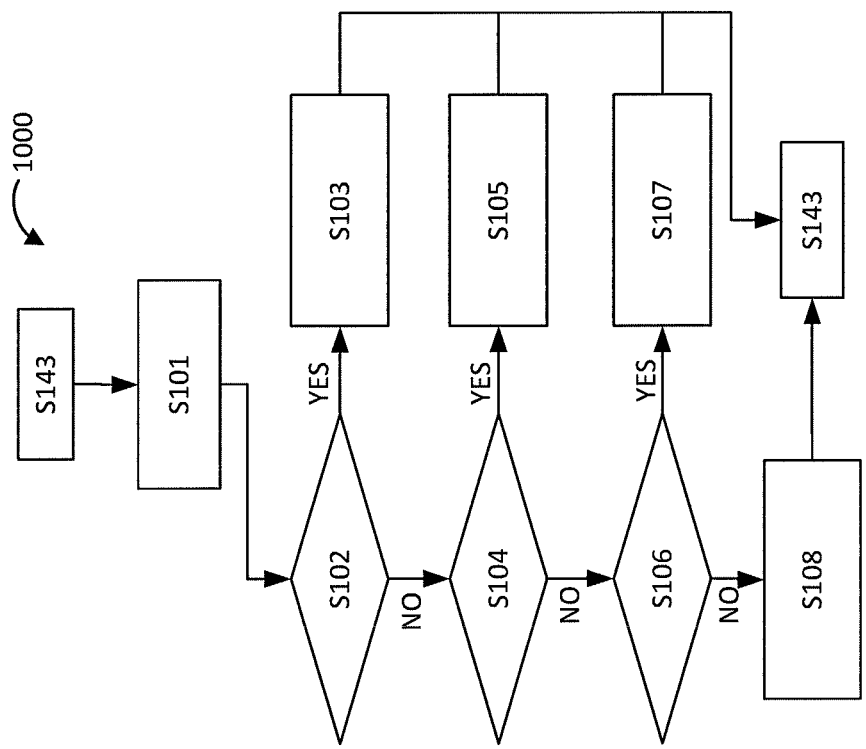
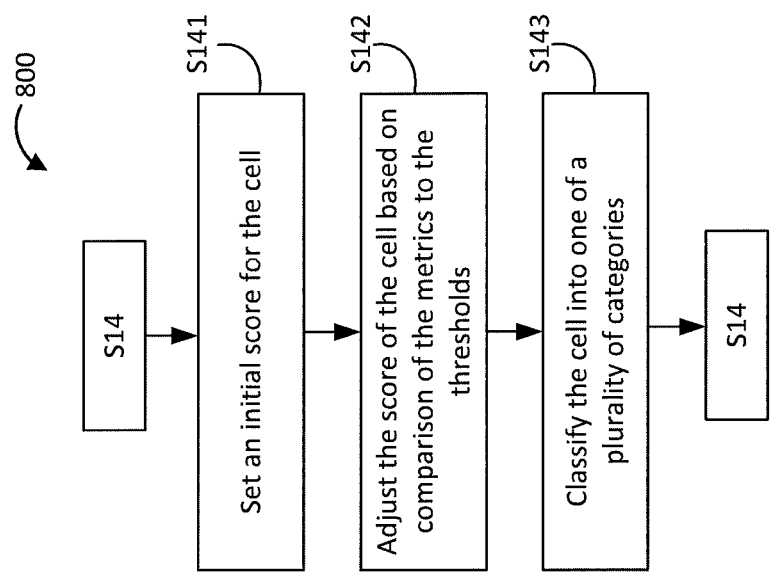
Figure 10
Figure 8

KPI-BASED TILT RANGE SELECTION

PRIORITY

This nonprovisional application is a U.S. National Stage Filing under 35 U.S.C. § 371 of International Patent Application Serial No. PCT/EP2019/073360 filed Sep. 2, 2019and entitled "KPI-Based Tilt Range Selection" which claims priority to European Patent Application No. 19382638.5 filed Jul. 25, 2019 both of which are hereby incorporated by reference in their entirety.

TECHNICAL FIELD

The present invention generally relates to the field of radiofrequency design and optimization. In particular, the present invention is directed to apparatuses and methods for determining a suitable tilt range for a plurality of antennae in a plurality of cells in a wireless cellular telecommunications network.

BACKGROUND

Radiofrequency (RF) design in a wireless cellular telecommunication network fully conditions the overall Quality of Service (QoS) perceived by subscribers. Generating an optimal RF design involves a complex trade-off between capacity, coverage and quality. This is extremely important for LTE, specifically for interference control, since either frequency planning (GSM) or soft-handover (UMTS) is not available, and one-to-one reuse is the most common frequency deployment to maximize spectrum efficiency.

QoS can be considered as a combination of coverage, quality and capacity. While coverage may be defined as the area in which the received desired signal level is above a predefined threshold, quality may be guaranteed with a minimum signal-to-interference power ratio. Further, capacity can be considered as the capability of the network to offer the requested service to the subscribers. The improvement of one of these metrics may, however, imply degradation in the other two. In this sense, higher signal level provokes higher interference in the adjacent cells.

RF design may be determined by the antenna configuration at every cell, together with the set of sites (e.g. cells) that are selected to be part of the network. The antenna configuration of a given antenna may include parameters such as, for example, antenna type, height, azimuth, mechanical tilt and electrical tilt. RF optimization may refer to the process of determining an antenna configuration for one or more antenna of a network in order to provide optimised or improved QoS and, optionally, adjusting the antenna configurations of the one or more antenna accordingly. Similarly, RF tuning may refer to the adjustment of antenna configurations of one or more antenna of a network based on determined optimal values for the antenna configuration.

A proper antenna adjustment may improve coverage and reduce interference simultaneously, leading to higher requested traffic and the necessity of increasing the capacity. Capacity issues can be solved with the addition of new sites, but also simply with an antenna configuration that allows traffic offload from overloaded cells to less-loaded cells.

Manual RF tuning of a small network area is based on the work of highly skilled engineers, who normally devote a tremendous effort to determine optimal physical antenna adjustments to the existing antenna configuration in order to improve the QoS perceived by subscribers. Such a process is both time and labour intensive. Another source of cost is the need for a drive tests measurement campaign, which provides engineers with the necessary inputs to take their adjustment decisions. The determined adjustment recommendations are typically based on specific rules differently defined by every expert engineer, founded on the acquired individual experience along the years. As such, manual RF tuning may result in significant variability and a lack of consistency in the adjustment recommendations.

Furthermore, antenna configuration adjustments are typically determined on a cell-by-cell basis, and it is complicated to come up with final solutions that imply coordinated adjustment of multiple cells at the same time to maximize the QoS in a whole network area. Furthermore, where different engineers are responsible for the RF tuning of different cells, any variability or lack of coordination in their approach may further reduce the extent to which the RF design is optimized.

With the appearance of tools for automatic RF design and tuning, costs have reduced drastically, along with the delivery time, while increasing the size of the network that can be optimized simultaneously. Moreover, automatic approaches reduce the risk of implementing a poor plan that would happen when relying on making changes based on poor "expert intuition".

In addition to data collected during drive test measurement campaigns, Operational Support Systems (OSS) Statistics (performance management counters and call traces processing) are often used in combination with or as input to tools for automatic RF design. OSS describes the information processing systems used by operators to manage their communications networks. The use of OSS Statistics ensures that the whole customer experience is used as a source for each and every suggested RF change, maximizing the probability of success and using an efficient process based on tools.

In general, automatic RF tuning mostly focuses on electrical tilt changes, especially if Remote Electrical Tilt (RET) technology is available. RET may allow bulk changes through script files through a computer console at negligible cost, unlike other parameters (e.g. mechanical tilt, height or azimuth) that require a site visit for a manual change. However, automatic RF tuning may also cover any other antenna configuration parameters, including those that require a manual adjustment. These parameters that require a manual adjustment are sensitive to errors in database storage. In this sense, an engineer or other technical professional might need to visit a site to execute a request to modify a cell azimuth from e.g. 20 to 40 degrees and finally find out that the actual real azimuth was 50 degrees.

SUMMARY OF THE INVENTION

Technical Problem

Conventionally, there are two approaches for automatic RF optimization: cell-based optimization and area-based optimization.

In a cell-based optimization, an independent execution is done for every cell to decide the optimal tilt value, uncorrelated with the decisions made for the rest of cells. The decisions are normally based on expert rules, using metrics obtained from the same cell.

This approach is typically adopted for Self-Organizing Networks (SON) solutions and can be useful to automatically detect and fix suboptimal operation of particular cells, which can be fixed automatically with no need of human intervention. The algorithms are normally executed in an iterative way, using refreshed metrics after the changes of the previous iteration have been applied. Therefore, they can correct the effect of external factors to the network performance, such as environment variations, and also the effect of the gradual growth and expansion of the network, as well as other internal configuration updates. However, these solutions do not consider the network as a whole and do not find an optimal coordinated overall configuration. Examples of cell-based optimization algorithms are described in O. N. C. Yilmaz at al., "Self-optimization of remote electrical tilt," 21st Annual IEEE International Symposium on Personal, Indoor and Mobile Radio Communications, Istanbul, 2010, pp. 1128-1132; Y. Khan et al., "Centralized self-optimization in LTE-A using Active Antenna Systems," 2013 IFIP Wireless Days (WD), Valencia, 2013, pp. 1-3; V. Buenestado et al., "Self-tuning of Remote Electrical Tilts Based on Call Traces for Coverage and Capacity Optimization in LTE," IEEE Transactions on Vehicular Technology, vol. 66, no. 5, pp. 4315-4326, May 2017.

In particular, the problems of the sector-based (cell-based) approaches in existing solutions are summarized below:

In sector-based approaches, decision are made per cell, and not harmonized or synchronized among all cells covering the whole network area. Several sectors might be independently adjusted to solve the same issue on a certain area, ending up with a new problem caused by the lack of coordination. An area with an interference problem would, for example, typically result in a sector-based algorithm proposing that a downtilt be performed in several different cells, instead of determining that, for example, just one of the cells should be subjected to a downtilt, or that one or more of the cells should be subjected to a downtilt and some neighbouring cell(s) should perform an uptilt to compensate.

Furthermore, in sector-based approaches, centralized solutions such as described in V. Buenestado et al., "Self-tuning of Remote Electrical Tilts Based on Call Traces for Coverage and Capacity Optimization in LTE," IEEE Transactions on Vehicular Technology, vol. 66, no. 5, pp. 4315-4326, May 2017 consider information from CTR involving other cells, but they are very demanding in terms of computational cost. It is necessary to store all measurement data reported in an area and to process the stored data separately for each cell. Moreover, the decisions are still not coordinated among different cells.

In addition, due to this lack of coordination in decisions, sector-based approaches are only useful when executed periodically (e.g. daily) to correct the effect of external factors to the network performance, such as environment variations. However, since the cell site has to be switched off for safety reasons during such antenna configuration adjustment, network operators are required to keep configuration changes to a minimum.

As a further issue, sector-based approaches are not suitable for scenarios in which antennae are shared by multiple cells on different carriers but have the same band (multilayer).

Furthermore, sector-based approaches are normally based on expert rules. The fewer factors that are considered in the sector-based optimization algorithm, the lower the accuracy and probability of improving the performance will be. Equally, as the number of factors considered increases, the complexity involved in adjusting the contribution of every factor to the final decision increases. Accordingly, it is generally necessary to set specific rules for each network, which still requires the support of expert RF engineers.

In an area-based approach, algorithms search for a combination of electrical tilts that maximizes a cost function that represents the performance of a network, rather than focus on the cell's Key Performance Indicators (KPIs). For a moderate size network, the number of combinations to evaluate is enormous. By way of example, in a case where 1000 cells are to be optimized, based on ten possible electrical tilt values, the number of possible combinations to be analysed is $10^{1000}$. For this reason, metaheuristic search algorithms are typically considered, see J. Ramiro and K. Hamied, eds, "Self-organizing networks: self-planning, self-optimization and self-healing for GSM, UMTS and LTE," John Wiley & Sons, 2011. Area considerations may permit flexibility to give higher priority to the performance improvement of those areas with higher traffic or based on other strategic criteria.

An example of area-based approach can be found in the Ericsson Cell Optimizer tool, see "Ericsson Cell Optimizer 19A Commercial Description", Ericsson Internal, document no. 232/221 01-FCP 118 1715 Uen, November 2018. Other examples of area-based optimization are described in J. Ramiro and K. Hamied, eds, "Self-organizing networks: self-planning, self-optimization and self-healing for GSM, UMTS and LTE," John Wiley & Sons, 2011 and J. Peerajing et al., "Multisector optimization of antenna tilt angle based empirical knowledge from drive test," 2016 13th International Conference on Electrical Engineering/Electronics, Computer, Telecommunications and Information Technology (ECTI-CON), Chiang Mai, 2016, pp. 1-6.

The Ericsson Cell Optimizer tool (also referred to as Ericsson Cell Optimizer) supports simultaneous optimization of GSM, UMTS and LTE cells. This is crucial when cells of different technologies or carriers on the same band share the same antenna. The performance of the Ericsson Cell Optimizer solution to improve coverage and dominance is widely recognized. Decisions are based on the resolution of areas limited by coverage, interference and/or capacity. The geographical distribution of the received signal level and interference is determined by a proprietary algorithm that ensures the same statistical information as extracted from the Performance Management (PM) and/or Call Trace (CTR) data available at the OSS, see U.S. Pat. No. 8,385,908 B2. In other words, the KPIs in the OSS must match the KPIs in the project prior to optimization. CTR can also be used to generate geolocated virtual drive test maps to get further increased accuracy, especially if Minimization of Drive Test (MDT) feature is available, see J. Johansson et al., "Minimization of drive tests in 3GPP release 11," IEEE Communications Magazine, vol. 50, no. 11, pp. 36-43, November 2012.

During the optimization process with the Ericsson Cell Optimizer, the system receives a model to be optimized and converges step by step towards the optimum solution. At each decision point of this convergence process, alternatives are selected based on technical considerations and restrictions that have been imposed, and to which extent the proposed evolution of the design is decrementing the cost function that is to be minimized. Optionally, after optimization, the Ericsson Cell Optimizer generates an implementation plan that allows the operator to orchestrate the changes in such a way that the network performance is not jeopardized during the intermediate states.

Area-based optimization approaches are generally advantageous in that they enable the network to be considered as a whole to find an optimal coordinated overall configuration. However, there are certain KPIs that cannot be translated into any of the parameters that form the model to be optimized. An example is call drops due to the mobility in the network, because many area-based optimization algorithms, such as the Ericsson Cell Optimizer, are based on a static model. Another example of a KPI that is not taken into consideration is call drops due to uplink power outage because area-based solutions based on CTR, such as the Ericsson Cell Optimizer, consider downlink propagation maps. The different reasons for call drops are usually collected and cumulated under a common counter, which makes the mapping into optimization model parameters difficult.

All these considerations can be mitigated with an exhaustive inspection of the relevant KPIs by a user(e.g. an expert engineer or other technical professional), who can bias the behaviour of an area-based optimization algorithm (e.g. the Ericsson Cell Optimizer) with a smart configuration of the tool, by selecting an appropriate range of valid output tilt values for every sector. By way of example, an expert engineer may exclude uptilts from the list of valid tilt values that may be determined for a cell, in a case where the expert engineer suspects that there are uplink power outage problems in that cell. In the end, the user normally makes a deep audit to verify the liability of every proposed change, in an attempt to avoid proposing tilt and other antenna configuration adjustments that are technically not plausible (e.g. the downtilt of a cell pointing outside the network area border, or the uptilt of an overshooting cell).

Accordingly, the autonomy of the Ericsson Cell Optimizer and similar area-based optimization solutions is reduced, because these solutions still rely on the input of expert users. In particular, in area-based approaches, expert knowledge is required to configure the optimizer, mainly in terms of deciding which cells to optimize and what range of valid values to apply as allowable outputs for each of the cells. Extra expert knowledge is usually required to select the final optimized values, which reduces the automation degree of this type of solutions. As such, automatic RF optimization remains relatively time and labour intensive and susceptible to any variability or lack of coordination in the approach of different engineers.

Area-based approaches are also associated with other disadvantages. For example, as area-based optimization algorithms find optimal solutions based on an input model (e.g. propagation map, based on OSS statistics and CTR), the results are very sensitive to the accuracy of this model. Even in cases where the model is highly accurate, there are certain KPIs that cannot be translated into the downlink propagation model, e.g. call drops (such as those due to mobility or to uplink power outage), and/or overshooting, i.e. cells generating interference to areas served by other cells, beyond their own best served area.

Summary of the Solution

The present invention addresses the above technical problems.

In particular, in view of the limitations discussed above, the present inventors have devised, in accordance with a first example aspect herein, a computer-implemented method for determining a tilt range for each cell of a plurality of cells of a wireless cellular telecommunications network, each cell having at least one antenna. The method comprises the steps of: for each cell of the plurality of cells, determining a value for each of a plurality of metrics , the plurality of metrics comprising: a metric indicative of retainability, a metric indicative of capacity, a metric indicative of uplink, UL, quality, a metric indicative of downlink, DL, quality, and a cell parameter; determining respective thresholds for each metric; for each cell of the plurality of cells, classifying the cell into one of a plurality of categories based on a comparison of the determined values of the plurality of metrics of the cell to the corresponding thresholds, wherein each category of the plurality of categories has an associated range of tilt values; and determining, for each cell of the plurality of cells, the tilt range for that cell as the range of tilt values associated with the category into which the cell is classified.

The present inventors have further devised, in accordance with a second example aspect herein, a computer program which, when executed by a computer, causes the computer to perform the method according to the first example aspect herein.

The present inventors have further devised, in accordance with a third example aspect herein, a non-transitory computer-readable storage medium storing a computer program in accordance with the second aspect.

The present inventors have further devised, in accordance with a fourth example aspect herein, a signal carrying a computer program in accordance with the second aspect.

The present inventors have further devised, in accordance with the fifth example aspect herein, an apparatus for determining a tilt range for each cell of a plurality of cells of a wireless cellular telecommunications network, each cell having at least one antenna. The apparatus comprises a metric determining module configured to determine, for each cell of the plurality of cells, a value for each of a plurality of metrics, the plurality of metrics comprising: a metric indicative of retainability, a metric indicative of capacity, a metric indicative of UL quality, a metric indicative of DL quality, and a cell parameter. The apparatus further comprises a threshold determining module configured to determine respective thresholds for each metric; a classifying module configured to, for each cell of the plurality of cells, classify the cell into one of a plurality of categories based on a comparison of the determined values of the plurality of metrics of the cell to the corresponding thresholds, wherein each category of the plurality of categories has an associated range of tilt values; and a tilt range determining module configured to determine, for each cell of the plurality of cells, the tilt range for that cell as the range of tilt values associated with the category into which the cell is classified.

BRIEF DESCRIPTION OF THE DRAWINGS

Embodiments of the invention will now be explained in detail, by way of non-limiting example only, with reference to the accompanying figures, described below. Like reference numerals appearing in different ones of the figures can denote identical or functionally similar elements, unless indicated otherwise.

FIG. 8 is a flow diagram illustrating a process by which the apparatus of FIG. 3 may classify each cell of a plurality of cells into one of a plurality of categories, according to an example aspect herein.

FIG. 10 is a flow diagram illustrating a process by which the apparatus of FIG. 3 may classify a cell into one of a plurality of categories based on an adjusted score of the cell, according to an example aspect herein.

DETAILED DESCRIPTION

Figure 1:
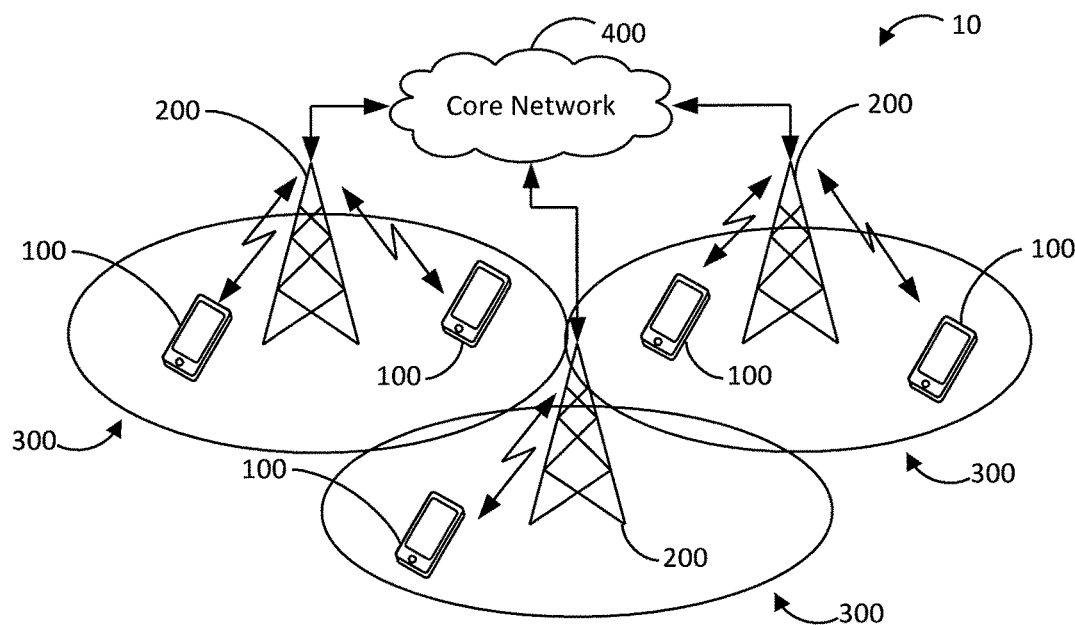
FIG. 1 is a schematic illustration showing a radio communication system, according to an example aspect herein.

Example embodiments of the present invention will now be described in detail with reference to the accompanying drawings.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

FIG. 1 is a schematic illustration showing a radio communication system 10, according to an example aspect herein. The radio communications system 10, and exemplary wireless telecommunication network, comprises a plurality of user equipments (UE) 100 and a plurality of radio base stations 200. Each radio base station 200 may, as in the present embodiment, be a LTE-A eNodeB. Alternatively, the radio base station may be, for example, a 5G gNB (next generation NodeB), LTE eNodeB, a 3G nodeB, or any other suitable base station. Each of the radio base stations 200 may be configured to communicate with a core network 400.

Each radio base station 200 is associated with a respective cell 300 and provides access to a radio communications network for the UEs 100 in that cell 300, for example via beamforming. In the example shown in FIG. 1, each of the radio base stations 200 illustrated serve one or two UEs 100. However, in alternative embodiments, the radio base station 200 may provide service to multiple UEs (e.g. three or more UEs). Furthermore, in the example shown in FIG. 1, the wireless cellular telecommunications network comprises three cells 300. By way of alternative, the suitable wireless cellular telecommunications network may comprise, for example, one or more cells, 10 or more cells, 100 or more cells, or any other suitable number of cells.

Each UE 100 may be in radio communication with the radio base station of the cell within which it is located. Each UE 100 may, as in the present embodiment, be configured to transmit data and/or uplink control information to the radio base station 200 of the cell in which it is located on uplink channels and to receive information transmitted by that radio base station 200 on downlink channels.

Furthermore, each UE 100 may be mobile, such that the UE can be used while the user is moving and, as the user passes the boundary from one cell to the next, the UE is handed over from the radio base station of the first cell to that of the next cell.

In order to transmit information to and receive information from the UEs 100 in their respective cells 300, each of the radio base stations 200 may comprise one or more antenna. As part of the RF design of the wireless cellular telecommunications network 10, each antenna in each cell has a particular antenna configuration. The antenna configuration of a given antenna is determined by a plurality of parameters. The plurality of antenna configuration parameters may include, by way of example, antenna type, height, azimuth, mechanical tilt and electrical tilt.

Types of antenna may include, for example, parabolic antenna, horn antenna, Yagi-Uda antenna, log-periodic antenna, bow-tie antenna, log-periodic dipole array, dipole antenna, monopole antenna, loop antenna, helical antenna, an array of active and passive antenna elements, etc. Furthermore, the type of the antenna may include whether the antenna comprises one or more elements and whether the antenna is configured for massive input massive output (MIMO) transmission and reception.

The height of an antenna may be defined as the height above ground of the antenna's centre of radiation or the antenna height above ground elevation level. The azimuth of an antenna may be defined as the rotation of the whole antenna around a vertical axis, with the azimuth being set to 0° when the antenna faces, for example, north.

The tilt or downtilt of an antenna may be defined as the inclination of the antenna or of the centre of radiation of the antenna relative to a horizontal axis (in particular, an axis that is perpendicular to the vertical axis about which azimuth is measured). In particular, for example, an antenna may have a downtilt value of 0 degrees in the centre of radiation of the antenna is parallel to a horizontal axis and the downtilt value may increase in the positive direction as the antenna or the main propagation direction of the antenna is tilted towards the ground. Uptilt may be defined as the inverse of the tilt value (that is, uptilt decreases as the antenna is tilted towards the ground).

Antenna tilt may be implemented mechanically or electrically. FIGS. 2(*a*), 2(*b*) and 2(*c*) are schematic illustrations showing how antenna tilt may be implemented both electrically and mechanically.

In particular, FIG. 2(*a*) shows an antenna 20 comprising a plurality of antenna elements 21. Each of the antenna elements 21 may be driven by a respective control signal 22 received from a transmission/reception section (not shown) and outputs radio waves 23 in accordance with the control signal 22. When the antenna 20 is at a neutral position (that is, not tilted), the main propagation direction of the antenna 20, shown at reference sign 24, is parallel to a horizontal axis H.

FIG. 2(*b*) illustrates how the antenna 20 is tilted mechanically. In particular, mechanical tilt refers to the case in which the antenna 20 itself is tilted as a whole. This may be achieved, for example, by providing specific mechanisms as part of the brackets on which the antenna 20 is mounted or by any other suitable means. Accordingly, the main propagation direction 24 of the antenna 20 is tilted at an angle of $\theta_M$ relative to the horizontal axis H. Additionally or alternatively, mechanical tilt may be implemented remotely, a process which may be referred to as remote mechanical tilt (RMT).

Figures 2A, 2B, 2C:
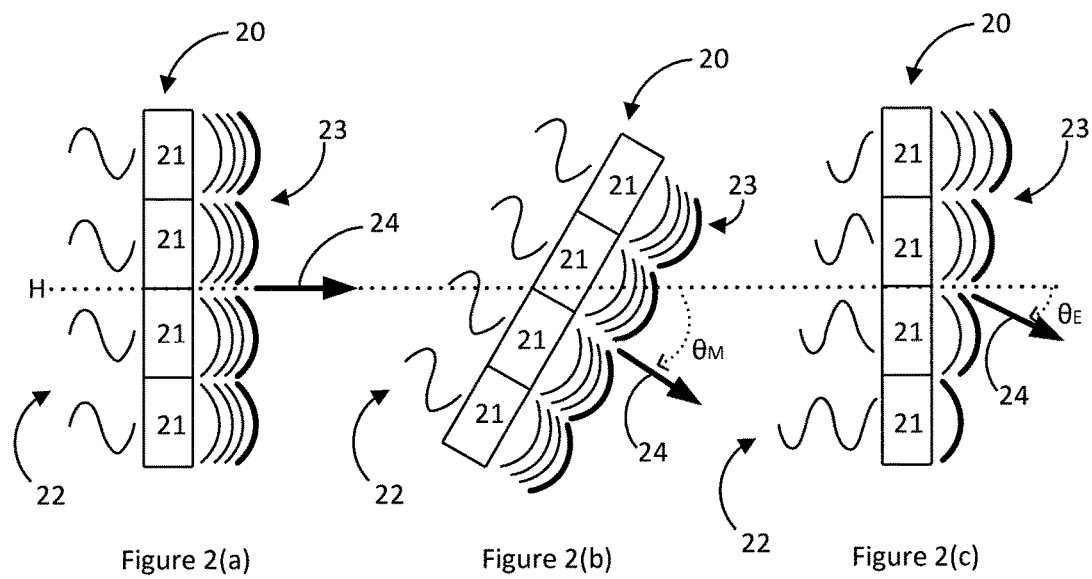
FIGS. 2(*a*), 2(*b*) and 2(*c*) are schematic illustrations showing how antenna tilt may be implemented both electrically and mechanically.

FIG. 2(c) illustrates how the antenna 20 is tilted electrically. Electrical tilt refers to the case in which the phase of the control signals 22 provided to each of the antenna elements 21 are varied, such that the main propagation direction 24 of the antenna 20 is tilted at an angle of $\theta_E$ relative to the horizontal axis H. Similar to mechanical tilt, electrical tilt may be implemented by providing specific mechanisms as part of the brackets on which the antenna 20 is mounted or by any other suitable means. Additionally or alternatively, electrical tilt may be implemented remotely, a process which is referred to as remote electrical tilt (RET).

As noted above, both area-based and sector-based RF optimization algorithms determine an optimum tilt value for each of a plurality of cells having one or more antenna. The present inventors have devised a novel approach to determining a tilt range for each cell of a plurality of cells of a wireless cellular telecommunications network, referred to as KPI-Based Tilt Range selection (KBTR). In general, KBTR complements area-based tilt optimization approaches, such as Ericsson Cell Optimizer, and aims at improving the overall solution provided by the area-based tilt optimization algorithm by detecting cells that are affected by special situations which can be addressed through tilt changes and determining a range of tilt values that may effectively address such situations. Therefore, KBTR may provide a reduced range of valid tilt values (that is, reduced relative to the full range of tilt adjustment values that may be implemented via electrical and/or mechanical tilt) for each cell, to be used later by an area-based tilt optimizer, such as Ericsson Cell Optimizer.

Figure 3:
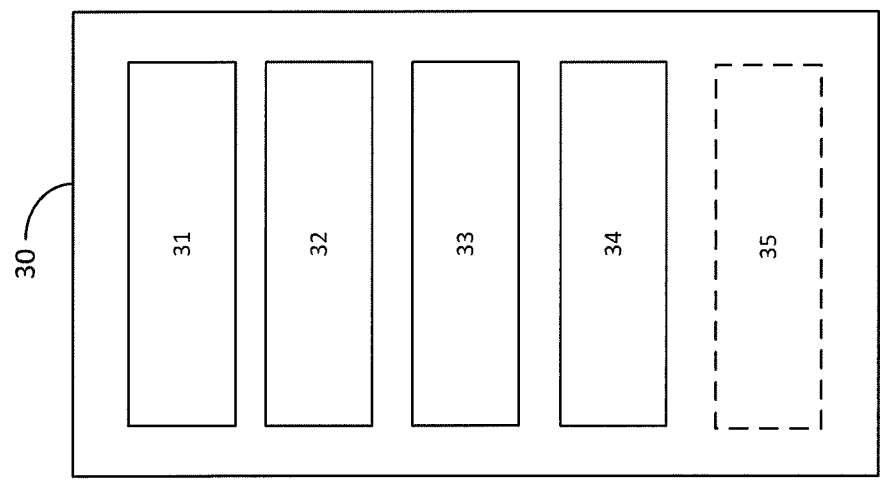
FIG. 3 is a schematic illustration of an apparatus for determining a tilt range for each cell of a plurality of cells of a wireless cellular telecommunications network, according to an example aspect herein.

FIG. 3 is a schematic illustration of an apparatus 30 for determining a tilt range for each cell 300 of a plurality of cells of a wireless cellular telecommunications network 10, according to an example aspect herein.

The apparatus comprises a metric determining module 31, a threshold determining module 32, a classifying module 33, a tilt range determining module 34 and, optionally, a communication module 35. The metric determining 31 module is configured to determine, for each cell 300 of the plurality of cells, a value for each of a plurality of metrics.

The plurality of metrics may comprise a metric indicative of retainability, a metric indicative of capacity, a metric indicative of uplink, UL, quality, a metric indicative of downlink, DL, quality, and a cell parameter.

Retainability may be defined as the ability of the wireless telecommunications network to retain services requested by a user for a desired duration once the user is connected to the services or as a probability as a service, once obtained by user, continues to be provided under given conditions for a given time duration. The metric indicative of retainability may, for example, comprise an average number of calls dropped per day of the cell, an average number of VoIP (voice over Internet protocol) calls dropped per day of the cell, or an average call completion success rate of the cell.

Capacity may be defined as the capability of the network to offer the requested service to the subscribers. The metric indicative of capacity may be, for example, utilization, which provides a measure of how far the network (or portion thereof, such as a cell) is from maximum capacity. Utilisation includes any metric that measures use of a network or, as in the present embodiment, use of a particular cell and the network by measuring traffic level and capacity resource management, including congestion, admission and load control. By way of example, utilization may be defined as the occupancy of the network with respect to the maximum capacity, in terms of physical resource block (PRB) utilization (for LTE or 5G), power level (transmitted for DL and received for UL) with respect to maximum power level (3G), or in terms of traffic volume. Furthermore, the metric indicative of capacity may be any one of, for example, PRB utilization for LTE, transmitted-to-maximum traffic power ratio in UMTS, or average transmitted-to-maximum power ratio in LTE.

The metric indicative of UL quality provides a measure of the quality of uplink transmission and may be, for example, any one of an interference over thermal noise (IoT) ratio, noise rise, received interference power (RIP), or any other suitable uplink radio quality measurement.

The metric indicative of DL quality provides a measure of the quality of downlink transmission and may be, for example, any one of a number of overshooting samples, number of interfering samples, reference signal received quality (RSRQ), energy per chip to interference power ratio (Ec/Io) for 3G, reference signal-signal to noise and interference ratio (RS-SINR) for 4G, or any other suitable downlink radio quality measurement. A sample may also be referred to as an instance or an occurrence of an event such as an event of overshooting or an event of interference between cells, such that the number of times an event of that definition occurs may be counted.

The metric indicative of UL quality and the metric indicative of DL quality may be determined as respective average values or percentile values for a given cell for a given time duration, such as a day or a week. The selection of the metric indicative of UL quality and the metric indicative of DL quality may also depend on radio access technology, e.g. whether the cell is a GSM cell, a UMTS cell, an LTE cell, an LTE-A cell, an NR cell, etc.

Each of the metric indicative of retainability, the metric indicative of capacity, the metric indicative of UL quality, the metric indicative of DL quality may be referred to as key performance indicators (KPIs)

The cell parameter may be any parameter that is set as part of the antenna configuration of the at least one antenna of the cell. The cell parameter may be, for example, any one of a tilt value of the at least one antenna of the cell, a height of the at least one antenna of the cell or an azimuth value of the at least one antenna of the cell. The tilt value of the at least one antenna of the cell may also be referred to as downtilt and the inverse of this value is known as uptilt.

Accordingly, the plurality of metrics includes both KPIs and cell parameters indicative of an antenna configuration (which may be referred to as a non-KPI).

The present inventors have advantageously recognised that by determining, in respect of each cell, a cell parameter and a single metric indicative of each of retainability, capacity, uplink quality and downlink quality, an accurate overview of the network may be provided and cells that are affected by special situations which can be addressed through tilt changes may be detected and high level recommendations may be proposed for these cells. Accordingly, by determining a single one of each type of metric, a number of metrics to be determined for a cell may be minimised without compromising the quality of the tilt ranges determined.

In addition, in some exemplary embodiments, the metric determining module 31 may determine two or more metrics indicative of retainability, two or more metrics indicative of capacity, two or more metrics indicative of uplink quality, two or more metrics indicative of downlink quality, and/or two or more cell parameters in respect of each cell.

Additionally or alternatively, in some exemplary embodiments the metric determining module 31 may calculate, for each cell of the plurality of cells, one or more mobility metrics (e.g.

handover failure rate, intra-frequency handover out success rate, or any other measure of the ability of the network to allow movement of users while still retaining the service for the user).

The threshold determining module 32 is configured to determine respective thresholds for each metric. The processes carried out by the threshold determining module 32 are described in more detail below in relation to process step S12 of FIG. 5.

The classifying module 33 is configured to, for each cell of the plurality of cells, classify the cell into one of a plurality of categories based on a comparison of the determined values of the plurality of metrics of the cell to the corresponding thresholds. Each category of the plurality of categories has an associated range of tilt values. The range of tilt values associated with each category of the plurality of categories may be selected so as to influence the optimum tilt value for that antenna that can be determined by an area-based tilt optimization algorithm in any suitable way. For example, the range of tilt values associated with each category of the plurality of categories may be selected so as to cause different respective degrees of uptilt or downtilt. Alternatively, range of tilt values associated with each category of the plurality of categories may be selected to cause different respective degrees of variation from the current tilt value of the at least one antenna of the cell.

The tilt range determining module 34 determines, for each cell of the plurality of cells, the tilt range for that cell as the range of tilt values associated with the category into which the cell is classified.

In embodiments such as the present embodiment in which the apparatus 30 comprises a communication module 35, the communication module 35 may be configured to provide the determined tilt ranges as an input to an area-based tilt optimization algorithm. Optionally, in some embodiments, the area-based tilt optimization algorithm 50 may determine an optimized tilt value for each cell of the plurality of cells, wherein the optimized tilt value for each cell is within the tilt range determined for that cell by the apparatus 30.

The communication module 35 may, as in the present embodiment, be configured to provide the determined tilt ranges as an input to the area-based tilt optimisation algorithm 50 by any suitable means known to those versed in the art. By way of example, communication module 35, may write the determined tilt ranges to a storage medium such as a CD or hard disk which may be used to transfer information to a computer or other device running the area-based tilt optimisation algorithm 50 or to transmit the determined tilt ranges to such computer via network such as the Internet. Furthermore, communication module 35 may provide the determined tilt ranges to a computer or other device running the area-based tilt optimisation algorithm 50 via a direct communication link (which may be provided by any suitable wired or wireless connection, e.g. a Universal Serial Bus (USB) or a Bluetooth™ connection), or an indirect communication link (which may be provided by a network comprising a Local Area Network (LAN), a Wide Area Network (WAN) and/or the Internet). By way of further alternative, the apparatus 30 may be further adapted to also run the area-based tilt optimisation algorithm 50 and the provision of the determined tilt ranges to the algorithm 50 may occur internally in the device via, for example, a system bus or other data transfer means or by writing the determined tilt ranges to shared memory.

The communication module 35 may, as in the present embodiment, be further configured to obtain data for use, by the metric determining module 31, in determining the plurality of metric values for each of the cells by any of the means discussed above for outputting data.

Accordingly, and as will become more apparent from the following description of the operations performed by the apparatus 30 of the present example embodiment, the apparatus (which may be considered an implementation of the KBTR approach devised by the present inventors) considers additional information to that typically used as input by area-based optimization algorithms. Accordingly, by providing the tilt ranges determined using this additional information as an input to an area-based tilt optimization algorithm, the area-based optimization algorithm may be prevented from out putting optimized tilt values that would otherwise not be recognisable as undesirable values. As such, the apparatus 30 may allow for the accuracy of RF optimization results obtained by an area-based optimization algorithm to be improved and the RF performance improvement provided by area-based tilt optimization approaches, such as Ericsson Cell Optimizer, may be maximised.

Optimization of tilt values is translated into RF efficiency, thereby allowing reduction of interference and transmission power, and even the necessity of adding new nodes to the network. As such, KBTR may result in a more efficient wireless configuration network.

KBTR is executed before the area-based tilt optimization algorithm, improving over the tasks that otherwise would have to be executed by an experienced RF design engineer to establish the necessary settings. In particular, based on set rules that are implemented in the apparatus 30 by determining respective thresholds for each metric and comparing the values of the plurality of metrics of each cell to the corresponding thresholds, KBTR allows cells that are affected by special situations to be detected and high level recommendations to be proposed for these cells. These recommendations are translated into valid tilt ranges per cell, which are provided as an input to an area-based tilt optimization algorithm. The valid tilt ranges determined for each cell of the plurality of cells may reduce or remove entirely the possibility of the area-based tilt optimization algorithm determining an optimized tilt value for a cell that is non-sensical or not technically plausible. As discussed above, in order to avoid such values in conventional area-based tilt optimization algorithm, the output optimized tilt values must be inspected exhaustively by an expert engineer.

Accordingly, as KBTR reduces or removes altogether the need for input by an expert engineer when using area based optimization algorithms, the reliability and consistency of optimization may be improved by reducing subjective and intuition-based input from expert engineers. Therefore, the confidence of current users in the provided results and the comparability of the current results may be improved. In addition, a number of potential users and use situations for area-based optimization may be increased, as the need for expert skills may be reduced or removed entirely.

In general, embodiments of the present invention may provide one or more the following advantages:

KBTR complements area-based tilt optimization solutions like, for example, the Ericsson Cell Optimizer, providing a fully automated solution thanks to the reduction or even suppression of need for expert support.

KBTR compensates for defects of the data models of area-based tilt optimization algorithms and consideration of extra effects, which translate into higher QoS with the provided solutions.

KBTR reduces the number of possible solutions that an area-based tilt optimization algorithm, such as the Ericsson Cell Optimizer, is required to consider by discarding tilt values that are unrealistic or those that are technically incompatible according to all available information.

As will be discussed in detail below, in determining the plurality of metrics for each cell, the apparatus 30 of FIG. 3 may use, for example, physical data of the wireless telecommunications network 10, configuration management (CM) and performance management (PM) data from the network's operational support systems (OSS) and call trace (CTR) data based on measurements reported periodically by user terminals, such as user terminals 100. Such data are, in general, also used by area-based tilt optimization algorithms (e.g. the Ericsson Cell Optimizer). Accordingly, the apparatus 30 may allow for RF performance improvement provided by area-based tilt optimization approaches to be maximised while reducing or eliminating entirely the need for additional data sources.

Furthermore, relative to conventional sector-based optimization algorithms, the KBTR approach devised by the present inventors may provide one or more of the following advantages:

Much of the data used in calculating the plurality of metrics for each cell may be pre-processed or predetermined distributions which may already be prepared for other network management purposes, rather than raw CTR message information. Therefore, the execution of the KBTR approach may be extremely fast.

KBTR provides ranges of valid tilt values for each of a plurality of cells and leaves the final tuning of the tilt values to the area-based tilt optimization algorithm, instead of directly providing a single tilt value. Accordingly, KBTR allows for coordination between the optimized tilt values of cells.

KBTR may allow thresholds to be efficiently determined based on statistical information from the considered cells in the network, instead of needing an expert user to set the particular suitable thresholds for every single cell (without taking other cells into account).

Figure 4:
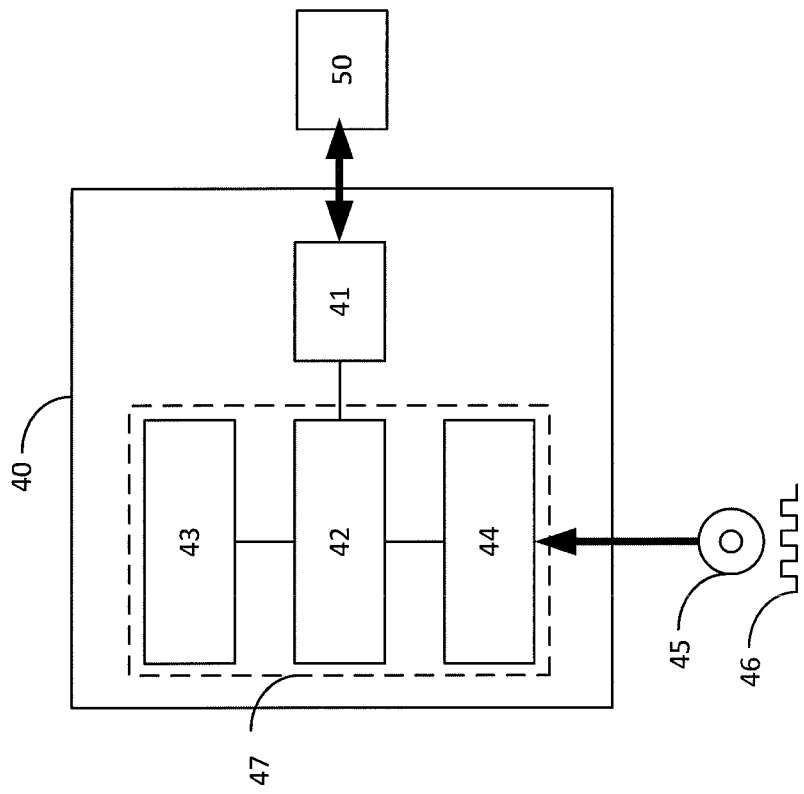
FIG. 4 is a block diagram illustrating an example signal processing hardware configuration of the apparatus of FIG. 3, according to an example aspect herein.

FIG. 4 is a schematic illustration of a programmable signal processing hardware 40, which may, as in the present example embodiment, be configured to function as the apparatus 30 of FIG. 3. The programmable signal processing hardware 40 comprises a communication interface (I/F) 41 for, in embodiments such as the present embodiment which comprise an optional communication module 35, providing the determined tilt ranges as an input to an area-based tilt optimization algorithm (indicated at reference sign 50 in FIG. 4). The signal processing apparatus 40 further comprises a processor (e.g. a Central Processing Unit, CPU, or Graphics Processing Unit, GPU) 42, a working memory 43 (e.g. a random access memory) and an instruction store 44 storing a computer program comprising the computer-readable instructions which, when executed by the processor 42, cause the processor 42 to perform various functions including those of the metric determining module 31, the threshold determining module 320 and the classifying module described above. The instruction store 44 may comprise a ROM (e.g. in the form of an electrically-erasable programmable read-only memory (EEPROM) or flash memory) which is pre-loaded with the computer-readable instructions. Alternatively, the instruction store 44 may comprise a RAM or similar type of memory, and the computer-readable instructions of the computer program can be input thereto from a computer program product, such as a non-transitory, computer-readable storage medium 45 in the form of a CD-ROM, DVD-ROM, etc. or a computer-readable signal 46 carrying the computer-readable instructions. In any case, the computer program, when executed by the processor, causes the processor to execute at least one of the methods for determining a tilt range for each cell of a plurality of cells of a wireless cellular telecommunications network described herein. It should be noted, however, that the apparatus 30 may alternatively be implemented in non-programmable hardware, such as an application-specific integrated circuit (ASIC).

In the present example embodiment, a combination 47 of the hardware components shown in FIG. 4, comprising the processor 42, the working memory 43 and the instruction store 44, is configured to perform functions of the metric determining module 31, the threshold determining module 32, the classifying module 33 and the tilt range determining module 34, which functions will now be described in further detail below.

Figure 5:
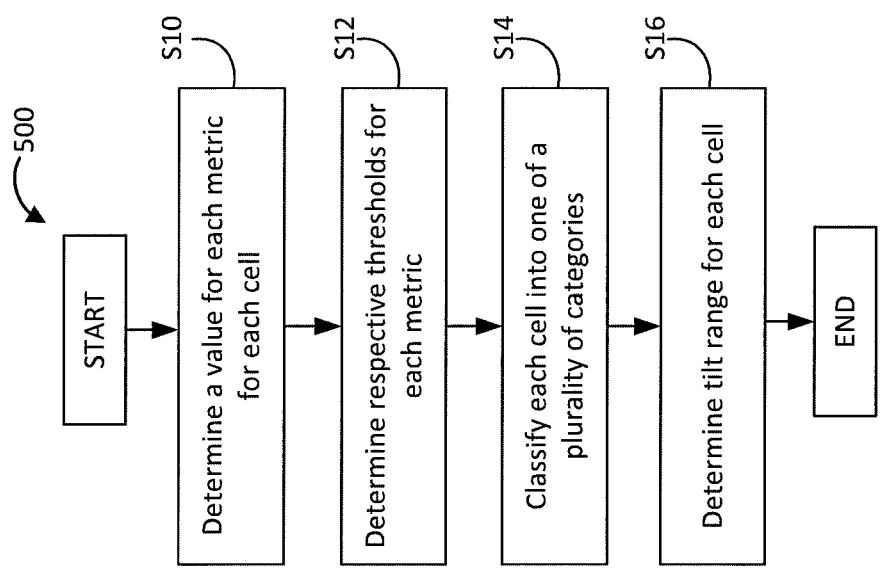
FIG. 5 is a flow diagram illustrating a process by which the apparatus of FIG. 3 may determine a tilt range for each cell of a plurality of cells of a wireless cellular telecommunications network, according to an example aspect herein.

FIG. 5 is a flow diagram illustrating a process 500 by which the apparatus 30 of FIG. 3 may determine a tilt range for each cell of a plurality of cells of a wireless cellular telecommunications network, according to an example aspect herein.

In process step S10 of FIG. 5, the metric determining module 31 determines, for each cell of the plurality of cells, a value for each of a plurality of metrics. The plurality of metrics comprise a metric indicative of retainability, a metric indicative of capacity, a metric indicative of UL quality, a metric indicative of DL quality, and a cell parameter. The particular metrics determined in respect of each cell may be, for example, any of the metrics discussed above in relation to the metric determining module 31 of the apparatus 30.

By way of example, the metric determining module 31 may, as in the present embodiment, obtain one or more of the following types of data as input for use in calculating the plurality of metrics in respect of each cell:

Physical data: topological information of the site locations for each cell (including, for example, elevation, latitude and longitude), and antenna configuration parameters (including, for example, azimuth, electrical tilt, mechanical tilt and height). This information is normally available from the network operator.

Configuration management (CM) data: configuration parameter values recorded in the OSS. Electrical tilt values for the at least one antenna of each cell may also be available from CM data.

Performance management (PM) data: counter values and other statistics recorded by the OSS that may be used to assess how well data is flowing in the network. Data recorded using PM counters may comprise, by way of non-limiting example, the IoT ratio, interference noise and/or thermal noise levels of one or more cells, the number of calls dropped for one or more cells, the number of attempted handovers, the number of successful handovers and/or handover failure rate for one or more cells, and/or any of the utilization metrics discussed above.

CTR data: call trace information based on periodical measurements reported by user terminals, including periodical measurements of signal levels (RSRP for LTE cells, RSCP for UMTS cells, etc.) for the best cells and the strongest interfering cells, as well as the timing advance (TA) distribution for one of more cells.

Drive test measurement campaign data: a method of measuring and assessing the coverage, capacity and Quality of Service (QoS) of a mobile radio network comprising using a motor vehicle containing mobile radio network air interface measurement equipment that can detect and record physical and virtual parameters of wireless cellular telecommunications network in a given geographical area.

In general, the metric determining module 31 may determine a cell parameter for each cell of the plurality of cells by, for example, obtaining details of the antenna configuration of the at least one antenna of each cell from the network operator. KPIs in respect of each cell for use as any of the determined metrics may be obtained pre-calculated from any suitable source. Alternatively, the metric determining module 31 may be configured to receive raw or pre-processed data and to calculate one or more KPIs in respect of each cell itself.

The cell parameter of any given cell may be, for example, a fixed value or remain constant between adjustment of the antenna configuration of the at least one antenna of the cell. For the other metrics of the plurality of metrics, the value of a metric for a given cell may be calculated based on PM data collected for that cell during a given data collection period (e.g. one week, two weeks, a month, etc.) By way of example, KPIs are normally obtained by aggregating counters for a 1 to 2 week collection period. CTR data may require normally one week of measurement collection during the busy hours or a couple of full days. Furthermore, KPIs may be calculated based on collected data as, for example, any one of an average, median, maximum and minimum value of the data per day, per hour, per week, etc.

In some embodiments, such as the present embodiment, each metric of the plurality of metrics is defined such that, for all of the metrics, an increase in the value of any metric for a given cell suggests that a tilt adjustment in a particular direction is recommended for that cell. This may serve to simplify the process step of classifying the plurality of cells, as discussed in detail below. By way of example, each metric of the plurality of metrics may be defined such that a high value for that metric for a cell is indicative of a condition of that cell which would be best addressed by tilting the at least one antenna of that cell downwards.

By way of specific example, the metric determining module may, as in the present embodiment, determine the following metrics: an average number of calls dropped per day of the cell, utilization, an IoT ratio, a number of overshooting samples, a number of interfering samples, a handover failure rate, a height, and an uptilt value (defined as inverse of tilt) by processing the input data to obtain a single value per metrics per cell. In particular, in the present exemplary embodiment, the average number of calls dropped per day of the cell is the metric indicative of retainability, utilization is the metric indicative of capacity, the IoT ratio is the metric indicative of UL quality, the number of overshooting samples and the number of interfering samples are both metrics indicative of DL quality, the handover failure rate is a metric indicative of mobility and both the height and the uptilt value are cell parameters.

Of these metrics, the IoT, drops, handover failure rate, and utilization are directly derivable from PM data. In particular, IoT ratios are a standard KPI that can be obtained from PM counters for every cell, as is the average number of drops per day for every cell. Handover failure rate is a KPI obtained from PM counters. By way of example, for each cell, this KPI may be computed as the total number of failed handover preparation attempts divided by the total number of handover preparation attempts initiated from that cell. Utilization may be defined as a KPI obtained from PM counters, which contain the 90th percentile of the downlink utilization per cell on the measured period, but limited to the busiest daily frame for a given number of hours (e.g. 2 hours). The same daily frame for the same number of hours is used for all cells and all days.

In embodiments, such as the present embodiment, in which the metric indicative of DL quality comprises a number of overshooting samples, the value of number of overshooting samples for a cell may be determined using a timing advance, TA, distribution, defined as a histogram of distance values associated with periodically reported TA measurements of the cell. The periodically reported TA measurements of each cell may be obtained from CTR data and the TA distribution may be calculated in advance.

Figure 6:
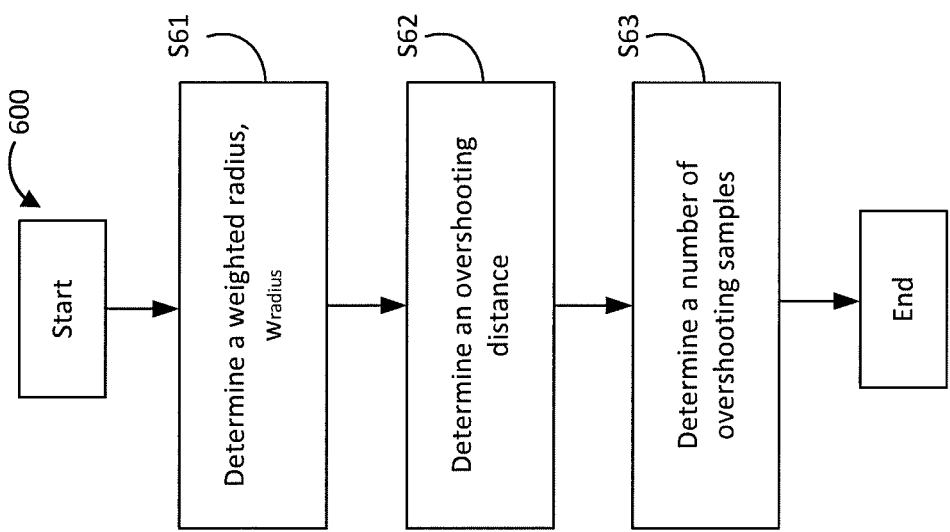
FIG. 6 is a flow diagram illustrating a process by which the apparatus of FIG. 3 may determine a value of the number of overshooting samples for a cell, according to an example aspect herein.

FIG. 6 is a flow diagram illustrating a process 600 by which the apparatus 30 of FIG. 3 may determine a value of the number of overshooting samples for a cell, according to an example aspect herein.

In particular, in process step S61 of FIG. 6, the metric determining module 31 determines the weighted radius, $w_{radius}$, as the average distance from the cell to its neighbouring cells, weighted by a number of successful handovers. Optionally, neighbouring cells may be discarded if they are co-sited with the cell in question or closer than a predetermined distance, e.g. 10 m from this cell. Cell latitudes and longitudes may be used to compute $w_{radius}$.

Optionally, the weighted cell radius, $w_{radius}$, may be further multiplied by a correction factor of e.g. 1.5. In a case where an ideal regular network based on hexagonal grid in which handovers only occur with the first tier neighbours, $w_{radius}$ should be equal to the distance to the first tier neighbours. The present inventors have surprisingly recognised that this distance may result in an unduly high estimate of the number of overshooting samples. By multiplying the $w_{radius}$ by a correction factor of 1.5, the corrected $w_{radius}$ is adjusted towards the average of a distance from the cell to its first tier neighbours and a distance from the cell to its second tier neighbours in an ideal network, resulting in a more realistic approach and accurate estimate of the number of overshooting samples.

In process step S62 of FIG. 6, the metric determining module 31 determines an overshooting distance as a smallest distance having a null value in the TA histogram that is larger than $w_{radius}$, or, if this distance is not found, determining the overshooting distance as $w_{radius}$. A distance having a null value in the TA histogram is any distance (or range of distance values) in the TA histogram, for which there are no reported TA measurements which are associated with that distance.

In process step S63 of FIG. 6, the metric determining module 31 determines the number of overshooting samples as a number of reported TA measurements associated with each distance value of the TA histogram that is greater than the overshooting distance.

The number of interfering samples for a cell may, as in the present embodiment, be obtained using a TA histogram of the cell and an interference matrix, IM, which comprises one histogram of serving-to-interference reference signal received power, RSRP, ratio for each pair of serving-interferer cells of the wireless cellular telecommunications network. RSRP levels are obtained from periodical measurements reported by the UEs for the case of LTE. In the case of UMTS, for example, periodical RSCP measurements are used instead. For every cell, the number of interfering samples may be determined as the number of samples in the IM where the cell is an interferer and is received with RSRP equal or higher than best server's RSRP minus, for example, 3 dB.

In process step S12 of FIG. 5, the threshold determining module 32 determines respective thresholds for each metric.

The threshold determining module 32 may determine a threshold by calculating a value of the threshold or by obtaining a predetermined, pre-calculated or fixed value for the threshold from a memory, such as working memory 43 or instruction store 44 shown in FIG. 4. In some embodiments, the respective threshold values for at least one of the metrics may, as in the present embodiment, be calculated using the corresponding metric values of each of the plurality of cells. That is, the thresholds for at least some of the considered metrics may be based on statistics of metric's values from all cells of the plurality of cells, overcoming the conventional limitation of single cell optimization by an expert engineer or other technical professional.

By way of example, determining respective thresholds for each metric may comprise:
Determining a threshold indicative of a high level for the metric indicative of retainability;
Determining a threshold indicative of a low level for the metric indicative of retainability;
Determining a threshold indicative of a high level of the metric indicative of capacity;
Determining a threshold indicative of a low level of the metric indicative of capacity; and
Determining a threshold for each remaining metric of the plurality of metrics.

By way of alternative, determining respective thresholds for each metric may comprise determining a threshold indicative of a high level and a threshold indicative of a low level in respect of each metric, determining only a threshold indicative of a high level in respect of each metric, determining only a threshold indicative of a low level in respect of each metric, or determining one or more thresholds in respect of each metric by any other suitable means. By way of further alternative, the same number and type of thresholds may be determined for each metric or different numbers and types of thresholds may be calculated for each individual metric.

A threshold indicative of a high level for a given metric is a threshold for which, values that are greater than this threshold may be considered high relative to other cells. By way of example, a threshold indicative of a high level for a given metric may be any one of an average or median value, or a $60^{th}$, $70^{th}$, $80^{th}$, $90^{th}$ or $95^{th}$ percentile value which is calculated based on the corresponding metric values of each of the plurality of cells or, in a case where the plurality of cells constitutes only a part of the wireless cellular telecommunications network 30, based on the corresponding metric values of each cell in the entire wireless cellular telecommunications network 30. Alternatively, a threshold indicative of a high level for a given metric may be a predetermined value corresponding to any one of an average or median value, or a $60^{th}$, $70^{th}$, $80^{th}$, $90^{th}$ or $95^{th}$ percentile value which is pre-calculated based on previously collected data from one or more networks (optionally, including the wireless cellular telecommunications network 30).

Similarly, a threshold indicative of a low level for a given metric is a threshold for which, values that are less than this threshold may be considered low relative to other cells. By way of example, a threshold indicative of a low level for a given metric may be any one of an average or median value, or a $40^{th}$, $30^{th}$, $20^{th}$, $10^{th}$ or $5^{th}$ percentile value which is calculated based on the corresponding metric values of each of the plurality of cells or, in a case where the plurality of cells constitutes only a part of the wireless cellular telecommunications network 30, based on the corresponding metric values of each cell in the entire wireless cellular telecommunications network 30. Alternatively, a threshold indicative of a low level for a given metric may be a predetermined value corresponding to any one of an average or median value, or a $40^{th}$, $30^{th}$, $20^{th}$, $10^{th}$ or $5^{th}$ percentile value which is pre-calculated based on previously collected data from one or more networks (optionally, including the wireless cellular telecommunications network 30).

More generally, where both a threshold indicative of a high level and a threshold indicative of a low level are determined in respect of a metric, these thresholds may be described as a first threshold and the second threshold, respectively, wherein the first threshold is greater than the second threshold.

Similarly, where only a threshold is determined in respect of the metric, this threshold may be a threshold indicative of a high level or a threshold indicative of a low level. By way of example, in a case where the metric indicative of DL quality is a number of overshooting samples, DL quality will be seen to decrease as the metric increases. Accordingly, a threshold indictive of a high level for number of overshooting samples may be used to indicate a low level in DL quality. Similarly, by way of further example, in a case where the metric indicative of UL quality is an IoT ratio, UL quality will be seen to decrease as the metric increases. Accordingly, a threshold indicative of a high level for IoT ratio may be used to indicate a low level in UL quality.

In particular, whether a threshold indicative of a high level or a threshold indicative of a low level is used as the threshold for any one of the metrics indicative of UL quality, DL quality and cell parameter, may be determined based on a definition of that metric. By way of example, in embodiments in which a given metric of the plurality of metrics is defined such that an increase in the value of that metric for a given cell suggests that a tilt adjustment in a downward direction is recommended for the at least one antenna of that cell, a threshold indicative of a high level may be determined.

Figure 7:
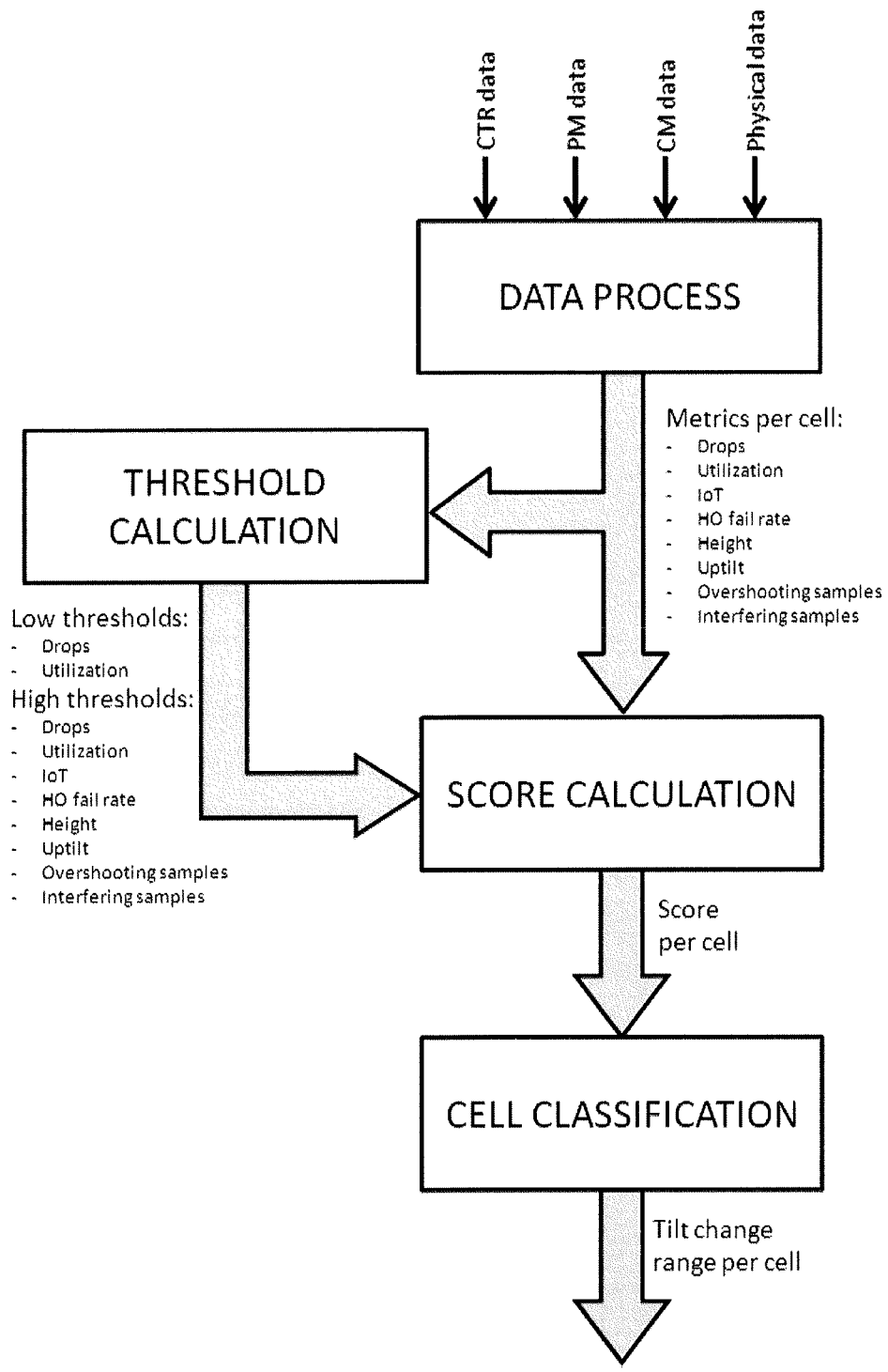
FIG. 7 is block diagram illustrating an example aspect herein.

By way of specific example, in the above exemplary embodiment in which the metric determining module determines an average number of calls dropped per day of the cell, utilization, an IoT ratio, a number of overshooting samples, a number of interfering samples, a handover failure rate, a height, and an uptilt value, the thresholds may be calculated as follows. FIG. 7 is block diagram illustrating this specific exemplary embodiment of the KBTR approach.

Calculation of Thresholds for Utilization

High threshold for utilization: This value may be constant and equal to 90% of cell capacity.
Low threshold for utilization: This value may be constant and equal to 50% of cell capacity.

While the values of 90% of 50% are used in the present embodiment, alternative values may also be selected depending on the type of environment and radio access technology. In general, in a case where the network is not heavily utilized, for example, these thresholds may be lowered dynamically.

Calculation of Thresholds for Average Number of Calls Dropped Per Day of the Cell Low threshold for average number of calls dropped per day of the cell: A distribution of the number of dropped calls per day is created with all the values of drops per day from all the cells, and the 10th percentile is selected as the low threshold for drops.

High threshold for average number of calls dropped per day of the cell: A high dropper cell list is created with the minimum subset of cells which sum 45% of drops with respect to the total sum of drops from all cells. The high threshold for drops is then computed as the lowest drops of the high dropper cell list.

Calculation of High Thresholds for the Rest of Considered Metrics

The rest of considered metrics are: IoT ratio, number of overshooting samples, number of interfering samples, handover failure rate, height, and uptilt. Uptilt is defined as the inverse of tilt, i.e. uptilt=−tilt (e.g. a tilt of −2 degrees implies the cell is tilted upwards by 2 degrees, and uptilt=2 degrees).

The high threshold for each of these metrics may be computed using the following approach:
Check if there is at least one cell in the range of 90th to 92.5th percentile of the metrics from all cells with high drops (i.e. cells with a higher average number of calls dropped per day of the cell than high threshold for drops).
If yes, the high threshold is the lowest metrics value in the range of 80th to 90th percentiles from all cells with high drops.
Otherwise, the high threshold is the 90th percentile from all cells.
Alternative fixed percentiles could be used depending on the type of environment and radio access technology.

In process step S14, the classifying module 33, for each cell of the plurality of cells, classifies the cell into one of a plurality of categories based on a comparison of the determined values of the plurality of metrics of the cell to the corresponding thresholds, wherein each category of the plurality of categories has an associated range of tilt values.

FIG. 8 is a flow diagram 800 illustrating a process by which the apparatus 30 of FIG. 3 may classify each cell of a plurality of cells into one of a plurality of categories, according to an example aspect herein.

In particular, in process step S141 of FIG. 8, the classifying module 33 sets an initial score for the cell.

In process step S142 of FIG. 8, the classifying module 33 compares the determined values of the plurality of metrics of the cell to the corresponding thresholds and adjusts the score of the cell based on each comparison.

In process step S143 of FIG. 8, the classifying module 33 classifies the cell into one of a plurality of categories based on the adjusted score of the cell.

Process step S142 of FIG. 8 may be implemented in any suitable way. By way of example, in the embodiments, such the present embodiment, in which determining respective thresholds for each metric comprises determining: a threshold indicative of a high level for the metric indicative of retainability; a threshold indicative of a low level for the metric indicative of retainability; a threshold indicative of a high level of the metric indicative of capacity; a threshold indicative of a low level of the metric indicative of capacity; and a threshold for each remaining metric of the plurality of metrics and in which each metric of the plurality of metrics is defined such that, for all of the metrics, an increase in the value of any metric for a given cell suggests that a tilt adjustment in a particular direction is recommended for the at least one antenna of that cell, process step S142 of FIG. 8 may be implemented in accordance with the process of FIG. 9.

Figure 9:
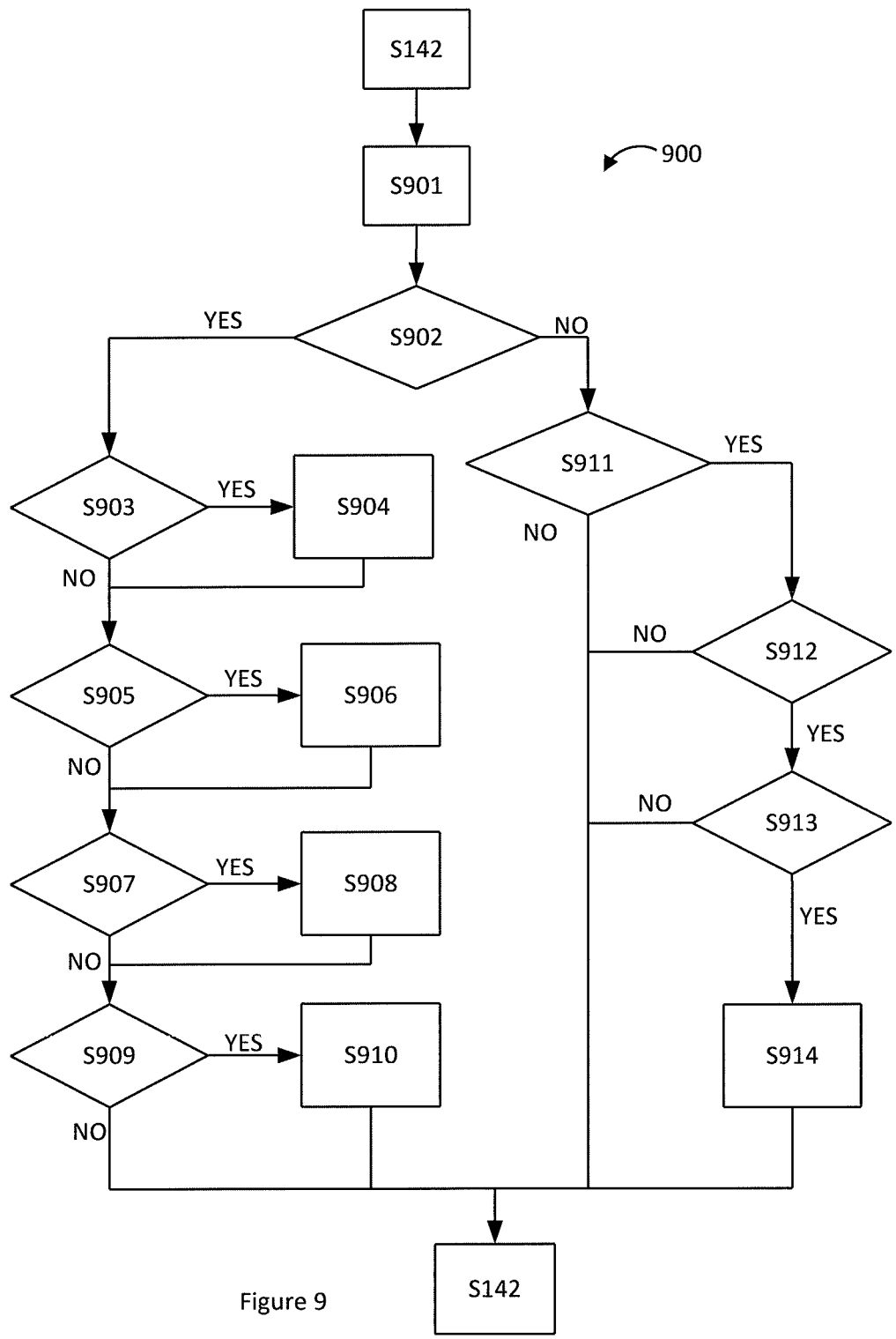
FIG. 9 is a flow diagram illustrating a process by which the apparatus of FIG. 3 may adjust a score of a cell based on a comparison of determined values of a plurality of metrics of the cell to corresponding thresholds, according to an example aspect herein.

FIG. 9 is a flow diagram 900 illustrating a process by which the classifying module 33 of the apparatus 30 of FIG. 3 may adjust a score of a cell based on a comparison of determined values of a plurality of metrics of the cell to corresponding thresholds, according to an example aspect herein.

In process step S901 of FIG. 9, the classifying module 33 sets a first adjustment value and a second adjustment value, wherein first adjustment value is greater than the second adjustment value.

In process step S902 of FIG. 9, the classifying module 33 determines whether the metric indicative of retainability is greater than or equal to the threshold indicative of a high level for the metric indicative of retainability. If YES, the process 900 proceeds to process step S903.

In process step S903 of FIG. 9, the classifying module 33 determines whether the metric indicative of DL quality is greater than or equal to the threshold for the metric indicative of DL quality. If YES, the process 900 proceeds to process step S904. In process step S904 of FIG. 9, the classifying module 33 increases the score of the cell by the first adjustment value. The process 900 then proceeds to process step S905.

In process step S905 of FIG. 9, the classifying module 33 determines whether the metric indicative of UL quality is greater than or equal to the threshold for the metric indicative of UL quality. If YES, the process 900 proceeds to process step S906. In process step S906 of FIG. 9, the classifying module 33 increases the score of the cell by the first adjustment value. The process 900 then proceeds to process step S907.

In process step S907 of FIG. 9, the classifying module 33 determines whether the metric indicative of capacity is greater than or equal to the threshold indicative of a high level of metric indicative of capacity. If YES, the process 900 proceeds to process step S908. In process step S908 of FIG. 9, the classifying module 33 increases the score of the cell by the second adjustment value. The process 900 then proceeds to process step S909.

In process step S909 of FIG. 9, the classifying module 33 determines whether the cell parameter is greater than or equal to the threshold for the cell parameter. If YES, the process 900 proceeds to process step S910. In process step S910 of FIG. 9, the classifying module 33 increases the score of the cell by the second adjustment value. The process 900 then returns to process step S142 of FIG. 8.

Returning to process step S902 of FIG. 9, in a case where the metric indicative of retainability is less than the threshold indicative of a high level for the metric indicative of retainability (i.e. NO), the process 900 proceeds to process step S911.

In process step S911 of FIG. 9, the classifying module 33 determines whether the metric indicative of retainability is less than or equal to the threshold indicative of a low level for the metric indicative of retainability. If NO, the process 900 then returns to process step S142 of FIG. 7.

If YES, the process 900 proceeds to process step S912. In process step S912 of FIG. 9, the classifying module 33 determines whether the metric indicative of DL quality is less than or equal to the threshold for the metric indicative of DL quality. If NO, the process 900 then returns to process step S142 of FIG. 8.

If YES, the process 900 proceeds to process step S913. In process step S913 of FIG. 9, the classifying module 33 determines whether the metric indicative of capacity is less than or equal to the threshold indicative of a low level of metric indicative of capacity. If NO, the process 900 then returns to process step S142 of FIG. 8.

If YES, the process 900 proceeds to process step S914. In process step S914 of FIG. 9, the classifying module 33 decreases the score of the cell by the second adjustment value and then returns to process step S142 of FIG. 8.

In the process 900 FIG. 9, the initial score, first adjustment value and second adjustment value may be a fixed value or a parameter that can be set in advance by the user of the apparatus 30 of FIG. 3. By way of alternative, the process 900 may involve further steps and determinations depending on the number of metrics determined for each cell. By way of further alternative, rather than setting a first adjustment value and the second adjustment value that may be used to adjust any of the metrics, one or more individual adjustment values may be set in respect of each metric. Furthermore, in alternative embodiments, one or more adjustment values may be set that may be used to adjust any of the metrics or that may be associated with any determination.

The process 900 of FIG. 9 may be used in embodiments, such as the present embodiment, in which each metric of the plurality of metrics is defined such that, for all of the metrics, an increase in the value of any metric for a given cell suggests that a tilt adjustment in a particular direction is recommended for the at least one antenna of that cell. By way of alternative, in a case where an increase in the value of each metric for a given cell may suggest that a tilt adjustment in a different respective direction is recommended for the at least one antenna of that cell, the determinations (greater than, less than, etc.) may be adjusted on a per metric basis to account for the different tilt directions recommended as each metric increases.

By way of specific example, in the above exemplary embodiment in which the metric determining module determines an average number of calls dropped per day of the cell, utilization, an IoT ratio, a number of overshooting samples, a number of interfering samples, a handover failure rate, a height, and an uptilt value, process step S142 of FIG. 8 may be implemented as follows.

The classifying module 33 sets an initial score of zero for the cell.

If the average number of calls dropped per day of the cell is greater than or equal to the determined threshold indicative of a high level for the average number of calls dropped per day of the cell, the classifying module 33 performs the following steps:
If the number of overshooting samples is greater than or equal to the threshold indicative of a high level for number of overshooting samples, the classifying module 33 increases the cell score by a first adjustment value (for example, 30).
If the IoT ratio is greater than or equal to the threshold indicative of a high level for the IoT ratio, the classifying module 33 increases the cell score by the first adjustment value.
If the handover failure rate is greater than or equal to the threshold indicative of a high level for handover failure rate, the classifying module 33 increases the score by the second adjustment value (for example, 10).
If the height is greater than or equal to the threshold indicative of a high level for height, the classifying module 33 increases the score by the second adjustment value.
If the number of interfering samples is greater than or equal to the threshold indicative of a high level for number of interfering samples, the classifying module 33 increases the score by the second adjustment value.
If utilization is greater than or equal to the threshold indicative of a high level for utilization, the classifying module 33 increases the score by the second adjustment value.
If the uptilt is greater than or equal to the threshold indicative of a high level for uptilt, the classifying module 33 increases the score by the second adjustment value.

If average number of calls dropped per day of the cell is less than or equal to the determined threshold indicative of a low level for the average number of calls dropped per day of the cell, the classifying module 33 performs the following steps:
If the number of overshooting samples is less than or equal to the threshold indicative of a high level for number of overshooting samples, and utilization is less than or equal to the threshold indicative of a low level for utilization, then decrease cell score by the second adjustment value.

The amounts by which score is increased due to the different metrics are constant, but can be modified with other values based on desired importance of the factor characterized by every metrics, normally with the help of expert RF engineer feedback.

In the example embodiments discussed above, process step S142 of FIG. 8 is implemented by process 900 of FIG. 9. By way of alternative, an adjusted score may be determined in respect of each cell by determining the score as, for example, the number of metrics which are greater than or equal to a threshold indicative of a high level for that metric or by any other suitable means.

Returning to FIG. 8, in process step S143 of FIG. 8, the classifying module 33 classifies the cell into one of a plurality of categories based on the adjusted score of the cell. Accordingly, a tilt range for each cell of a plurality of cells is determined as the range of tilt values associated with the category into which the cell is classified.

The range uptilt values associated with each category may be selected to have any suitable effect on the tilt value of the at least one antenna of the cell. In this regard, the range of tilt values determined for each cell may comprise a range of relative tilt values for use in adjusting the current tilt value of the at least one antenna of the cell. The range of the relative tilt values may be defined as an absolute value of the adjustment value (e.g. +1 degrees, −2 degrees, etc.) or as fractional or percentage adjustments of the current value (e.g. +25%, −50%, etc.). Alternatively, range of tilt values determined for each cell comprises a range of absolute tilt values for use in setting a tilt value of the at least one antenna of the cell.

Furthermore, the plurality of categories may comprise any suitable number of categories. By way of example, the plurality of categories may, as in the present embodiment, comprise at least four categories. The range of tilt values associated with the four categories may be defined as follows:
The range of tilt values associated with the first category are selected to cause an antenna to tilt downwards;
The range of tilt values associated with the second category are selected to cause an antenna to tilt downwards or maintain its current tilt value;
The range of tilt values associated with the third category represent a default range, wherein the tilt values of the default range permit to cause an antenna to tilt downwards, tilt upwards or maintain its current value; and The range of tilt values associated with the fourth category is selected to cause an antenna to tilt upwards.

By way of alternative, the number of categories may be adjusted such that a category is provided for each of the plurality of ranges of tilt values, each range selected to cause the antenna to tilt in a particular direction to a different extent. By way of further alternative, only two categories may be provided, one selected to cause uptilt and one selected to cause downtilt. Alternatively, the number of categories may be defined in any other suitable way.

Furthermore, process step S143 FIG. 8 may be implemented in any suitable way. By way of example, in embodiments such as the present embodiment, in which a plurality of categories comprises four categories, process step S143 FIG. 8 may be implemented in accordance with process 1000 of FIG. 10.

In particular, FIG. 10 is a flow diagram 1000 illustrating a process by which the classifying module 33 of the apparatus 30 of FIG. 3 may classify a cell into one of a plurality of categories based on an adjusted score of the cell, according to an example aspect herein.

In process step S101 of FIG. 10, the classifying module 33 determines a high threshold and a low threshold, wherein the high threshold is greater than the low threshold and both the high threshold and the low threshold are greater than zero.

In process step S102 of FIG. 10, the classifying module 33 determines whether the adjusted score of the cell is greater than or equal to the high threshold. If YES, the process 1000 proceeds to process step S103, in which the classifying module 33 classifies the cell in the first category. The process 1000 then returns to process step S143 of FIG. 8.

If NO, process 1000 proceeds to process step S104. In process step S104, classifying module 33 determines whether the adjusted score of the cell is greater than or equal to the low threshold. If YES, the process 1000 proceeds to step S105, in which the classifying module 33 classifies the cell in the second category, and the process 1000 then returns to process step S143 of FIG. 8.

If NO, process 1000 proceeds to process step S106. In process step S106, classifying module 33 determines whether the adjusted score of the cell is greater than or equal to zero. If YES, the process 1000 proceeds to step S107, in which the classifying module 33 classifies the cell in the third category, and the process 1000 then returns to process step S143 of FIG. 7.

If NO, process 1000 proceeds to process step S108. In process step S104, the classifying module 33 classifies the cell in the fourth category, and the process 1000 then returns to process step S143 of FIG. 8.

The process 1000 of FIG. 10 may be suitable in embodiments in which each metric of the plurality of metrics is defined such that, for all of the metrics, an increase in the value of any metric for a given cell suggests that a tilt adjustment in a downward direction is recommended for the at least one antenna of that cell. Thus, if the adjusted score of the cell is greater than or equal to the high threshold, the cell is sorted into the first category, for which the associated range of tilt values are selected to cause an antenna to tilt downwards. Similarly, if the adjusted score of the cell is less than zero, the cell is sorted into the fourth category, for which the associated range of tilt values are selected to cause an antenna to tilt upwards.

In alternative embodiments, in a case where an increase in the value of each metric for a given cell may suggest that a tilt adjustment in a different respective direction is recommended for the at least one antenna of that cell, the determinations (greater than, less than, etc.) and the thresholds may be adjusted for each category to account for the different tilt directions recommended as each metric increases and the resulting variations in the adjusted score.

In alternative embodiments, process 1000 of FIG. 10 may be adapted to any number of categories by setting a suitable number of thresholds and removing or introducing further determining and classifying steps. Furthermore, the high threshold and the low threshold may be set as any suitable value. By way of example, the values of the high threshold on the low threshold may be determined correspond to the adjustment values set in process 800 of FIG. 8.

By way of specific example, process 1000 of FIG. 10 may be implemented as follows:

If score of the cell is greater than or equal to 40, the classifying module 33 classifies the cell in a first category, "Force Downtilt". The first category is associated with a relative tilt change range of [1, 3].

If the score of the cell is less than 40 and greater than or equal to 30, the classifying module 33 classifies the cell in a second category, "Force Downtilt or Keep". The second category is associated with a relative tilt change range of [0, 3] degrees.

If the score of the cell is less than 30 and greater than or equal to 0, the classifying module 33 classifies the cell in third category, "Default Range". The third category is associated with a relative tilt change range of [−2, 3] degrees.

If the score of the cell is less than zero, the classifying module 33 classifies the cell in fourth category, "Force Uptilt". The fourth category is associated with a relative tilt change range of [−4, −1] degrees.

In this specific exemplary implementation, a relative tilt change range of e.g. [−2, 3] degrees means that the algorithm recommends to perform a maximum tilt decrease of 2 degrees and a maximum tilt increase of 3 degrees.

Returning to FIG. 5, in process step S16, the tilt range determining module 34 determines, for each cell of the plurality of cells, the tilt range for that cell as the range of tilt values associated with the category into which the cell is classified.

Following the performance of the process of FIG. 5, the communication module 35 may, optionally, provide the determined tilt ranges as an input to the area-based tilt optimization algorithm 50. As discussed in more detail above, the determined tilt ranges for each cell may be provided to the area-based tilt optimisation algorithm 50 in any suitable form and by any suitable means known to those in the art. By way of alternative, the determined tilt ranges may be stored for future use or processed in any other suitable way.

In some embodiments, the process 500 of FIG. 5 may be adapted to additionally include the step of determining an optimized tilt value for each cell of the plurality of cells using the area-based tilt optimization algorithm, wherein the optimized tilt value for each cell is within the determined tilt range of that cell.

In addition, in some embodiments, the process 500 of FIG. 5 may be further adapted to include the step of adjusting the tilt value of the at least one antenna of at least a subset of the plurality of cells based on the optimized tilt values. As discussed above the determined tilt range for each cell, and thus the optimised tilt value determined for each cell by the area-based tilt optimisation algorithm may be electrical or mechanical tilt values. Accordingly, adjusting the tilt value of at least one antenna may comprise manually or remotely adjusting the mechanical tilt value of the at least one antenna on site, manually or remotely adjusting the electrical tilt value of the at least one antenna on site or remotely adjusting the electrical tilt value of the at least one antenna using RET.

Furthermore, in the process 500 of FIG. 5, a set of thresholds are determined which are used in classifying each cell of the plurality of cells. In alternative embodiments, the process 500 of FIG. 5 may be adapted to further include the initial process step of dividing the plurality of cells of the wireless cellular telecommunications network into groups based on similarities in radio propagation conditions of the cells.

In such embodiments, the process 500 may then be performed in respect of each group of cells of the wireless cellular telecommunications network. That is, the process 500 may be performed for each group of cells, setting that group of cells as the plurality of cells. By way of example, one or more metrics of the plurality of metrics may be calculated using the corresponding metric values of each cell in the group of cells, such that the respective thresholds determined for each group may differ. Furthermore, the determining respective thresholds for each metric, the classification of each cell into one of the plurality of categories, and the number of categories into which a cell may be categorised may differ from group to group.

Dividing the plurality of cells of the wireless cellular telecommunications network into groups based on similarities in radio propagation conditions of the cells and performing the process 500 in respect of each group of cells, may be particularly useful in the case where the cells in any given group have similar RF conditions. In networks with heterogeneous environment conditions, cells should be previously classified in homogeneous groups, and KBTR should be executed independently for each group. By way of example, results may be improved by avoiding mixing urban and suburban cells on the same KBTR execution. By way of further example, results may be improved by avoiding mixing cells of different bands, because the average number of calls dropped for day of the cell and other KPIs may not be comparable between different frequency bands.

In addition to the advantages discussed above, embodiments of the present invention may additionally provide one or more of the following advantages:
- Advantageously, it is possible to use a simplified version of the solution that only uses these cell metrics: average number of calls dropped per day of a cell, utilization, IoT ratio, number of overshooting samples, and uptilt. IM is not used, which means that if TA is available at PM data, then it is not necessary to use CTR as input data.
- Advantageously, it is possible to use additional cell metrics that can affect or be affected by a tilt change, apart from average number of calls dropped per day of a cell, utilization, IoT ratio, number of overshooting samples, number of interfering samples, handover failure rate, height, and uptilt.
- Advantageously, it is possible to use drive test measurements instead of CTR to build IM and TA histogram.
- Advantageously, it is possible to use the solution as initial step before optimization, by limiting the possible output combinations and therefore steering the expert engineer decisions.
- Advantageously, it is possible to use the solution with 3G, 4G and 5G networks, and any other future cellular wireless communication technology.

In some alternative aspect, it may also be possible to reduce the tilt change ranges to single values, which implies no need for additional area-based tilt optimization, working a standalone solution. Advantageously, in this case, it may be possible to evolve the standalone solution towards a standalone SON solution, by executing the solution periodically. Advantageously, it may further be possible to evolve the standalone SON solution towards a Machine Learning solution, which considers the measured impact of the applied decisions of past executions to improve the settings and rules used in future executions, by using one or more machine learning modules such as e.g. deep neural networks.

Although detailed embodiments have been described, they only serve to provide a better understanding of the invention defined by the independent claims, and are not to be seen as limiting.

LIST OF ABBREVIATIONS

CM Configuration Management
CTR Call Traces
GSM Global System for Mobile communications
IM Interference Matrix
IoT Interference over Thermal noise
KBTR KPI-Based Tilt Range selection
KPI Key Performance Indicator
LTE Long Term Evolution
MDT Minimization of Drive Test
OSS Operational Support Systems
PM Performance Management
QoS Quality of Service
RET Remote Electrical Tilt
RF Radiofrequency
RSCP Received Signal Code Power
RSRP Reference Signal Received Power
SON Self-Organizing Networks
TA Timing Advance
UMTS Universal Mobile Telecommunication System

The invention claimed is:

1. A computer-implemented method for determining a tilt range for each cell of a plurality of cells of a wireless cellular telecommunications network, each cell having at least one antenna, the method comprising:
   for each cell of the plurality of cells, determining a value for each of a plurality of metrics, the plurality of metrics comprising:
      a metric indicative of retainability,
      a metric indicative of capacity,
      a metric indicative of uplink, UL, quality,
      a metric indicative of downlink, DL, quality, and
      a cell parameter;
   determining respective thresholds for each metric;
   for each cell of the plurality of cells, classifying the cell into one of a plurality of categories based on a comparison of the determined values of the plurality of metrics of the cell to the corresponding thresholds, wherein each category of the plurality of categories has an associated range of tilt values, and wherein classifying each cell into one of the plurality of categories comprises:
      setting an initial score for each cell;
      comparing the determined values of the plurality of metrics of each cell to the corresponding thresholds and adjusting the initial score of each cell based on each comparison;

classifying each cell into one of the plurality of categories based on the adjusted score of each cell; and
determining, for each cell of the plurality of cells, the tilt range for that cell as the range of tilt values associated with the category into which the cell is classified.

2. The method of claim 1, wherein the respective threshold values for at least one of the metrics are calculated using the corresponding metric values of each of the plurality of cells.

3. The method of claim 1, wherein:
the metric indicative of retainability is an average number of calls dropped per day of the cell an average number of VoIP, voice over Internet protocol, calls dropped per day of the cell, or an average call setup complete rate of the cell;
the metric indicative of capacity is any one of utilization, physical resource block, PRB, utilization, transmitted-to-maximum traffic power ratio, and average transmitted-to-maximum power ratio;
the metric indicative of UL quality is any one of an interference over thermal noise, IoT, noise rise and received interference power, RIP;
the metric indicative of DL quality is any one of a number of overshooting samples, number of interfering samples, reference signal received quality, RSRQ, energy per chip to interference power ratio, Ec/Io, and reference signal-signal to noise and interference ratio, RS-SINR; and
the cell parameter is any one of a tilt value of the at least one antenna of the cell, a height of the at least one antenna of the cell and an azimuth value of the at least one antenna of the cell.

4. The method of claim 1,
wherein adjusting the initial score of each cell based on each comparison comprises, for each one of the plurality of metrics. increasing or decreasing the initial score by a plurality of adjustment values.

5. The method of claim 4, wherein calculating respective thresholds for each metric comprises:
determining a threshold indicative of a high level for the metric indicative of retainability;
determining a threshold indicative of a low level for the metric indicative of retainability;
determining a threshold indicative of a high level of the metric indicative of capacity;
determining a threshold indicative of a low level of the metric indicative of capacity; and
determining a threshold for each remaining metric of the plurality of metrics.

6. The method of claim 5, wherein comparing the determined values of the plurality of metrics of the cell to the corresponding thresholds and adjusting the score of the cell based on each comparison comprises:
setting a first adjustment value and a second adjustment value, wherein first adjustment value is greater than the second adjustment value;
in a case where the metric indicative of retainability is greater than or equal to the threshold indicative of a high level for the metric indicative of retainability:
increasing the score of the cell by the first adjustment value in a case where the metric indicative of DL quality is greater than or equal to the threshold for the metric indicative of DL quality,
increasing the score of the cell by the first adjustment value in a case where the metric indicative of UL quality is greater than or equal to the threshold for the metric indicative of UL quality, increasing the score of the cell by the second adjustment value in a case where the metric indicative of capacity is greater than or equal to the threshold indicative of a high level of the metric indicative of capacity, and
increasing the score of the cell by the second adjustment value in a case where the cell parameter is greater than or equal to the threshold for the cell parameter; and
in a case where the metric indicative of retainability is less than or equal to the threshold indicative of a low level for the metric indicative of retainability:
decreasing the score of the cell by the second adjustment value in a case where the metric indicative of DL quality is less than or equal to the threshold for the metric indicative of DL quality and metric indicative of capacity is less than or equal to the threshold indicative of a low level of metric indicative of capacity.

7. The method of claim 1, wherein:
the plurality of categories comprises at least four categories;
the range of tilt values associated with the first category is selected to cause an antenna to tilt downwards;
the range of tilt values associated with the second category is selected to cause an antenna to tilt downwards or maintain its current tilt value;
the range of tilt values associated with the third category represent a default range, wherein the tilt values of the default range permit to cause an antenna to tilt downwards, tilt upwards or maintain its current value; and
the range of tilt values associated with the fourth category is selected to cause an antenna to tilt upwards.

8. The method of claim 7, wherein classifying the cell into one of the plurality of categories based on the adjusted score of the cell comprises:
determining a high threshold and a low threshold, wherein the high threshold is greater than the low threshold and both the high threshold and the low threshold are greater than zero;
classifying the cell in the first category in a case where the adjusted score is than or equal to the high threshold;
classifying the cell in the second category in a case where the adjusted score is less than the high threshold and greater than or equal to the low threshold;
classifying the cell in the third category in a case where the adjusted score is less than the low threshold and greater than or equal to zero; and
classifying the cell in the fourth category in a case where the adjusted score is less than zero.

9. The method of claim 1, wherein the metric indicative of DL quality comprises a number of overshooting samples, and wherein a value of a number of overshooting samples for a cell is determined using a timing advance, TA, distribution, defined as a histogram of distance values associated with periodically reported timing advance measurements of the cell.

10. The method of claim 9, wherein determining the value of the number of overshooting samples for a cell comprises:
determining a weighted radius, wradius, as the average distance from the cell to its neighbouring cells, weighted by a number of successful handovers;
determining an overshooting distance as a smallest distance having a null value in the TA histogram that is higher than wradius, or, if this distance is not found, determining the overshooting distance as wradius; and determining the number of overshooting samples as a number of reported timing advance measurements associated with each distance value of the TA histogram that is greater than the overshooting distance.

11. The method of claim 1, wherein the plurality of metrics comprises a number of interfering samples, the number of interfering samples is determined using an interference matrix, IM, comprising one histogram of serving-to-interference reference signal received power, RSRP, ratio for each pair of serving-interferer cells of the wireless cellular telecommunications network.

12. The method of claim 1, wherein the range of tilt values determined for each cell comprises a range of relative tilt values for use in adjusting a current tilt value of the at least one antenna of the cell.

13. The method of claim 1, wherein the range of tilt values determined for each cell comprises a range of absolute tilt values for use in setting a tilt value of the at least one antenna of the cell.

14. The method of claim 1, further comprising:
providing the determined tilt ranges as an input to an area-based tilt optimization algorithm; and
determining an optimized tilt value for each cell of the plurality of cells using the area-based tilt optimization algorithm,
wherein the optimized tilt value for each cell is within the determined tilt range of that cell.

15. The method of claim 14, further comprising adjusting the tilt value of the at least one antenna of at least a subset of the plurality of cells based on the optimized tilt values.

16. The method of claim 1, further comprising:
dividing the plurality of cells of the wireless cellular telecommunications network into groups based on similarities in radio propagation conditions of the cells,
wherein the method is performed in respect of each group of cells of the wireless cellular telecommunications network.

17. A non-transitory computer-readable storage medium storing a computer program which, when executed by a computer, causes the computer to:
for each cell of the plurality of cells, determine a value for each of a plurality of metrics, the plurality of metrics comprising:
a metric indicative of retainability,
a metric indicative of capacity,
a metric indicative of uplink, UL, quality,
a metric indicative of downlink, DL, quality, and
a cell parameter;
determine respective thresholds for each metric;
for each cell of the plurality of cells, classify the cell into one of a plurality of categories based on a comparison of the determined values of the plurality of metrics of the cell to the corresponding thresholds, wherein each category of the plurality of categories has an associated range of tilt values, and wherein classifying each cell into one of the plurality of categories comprises:
setting an initial score for each cell;
comparing the determined values of the plurality of metrics of each cell to the corresponding thresholds and adjusting the initial score of each cell based on each comparison;
classifying each cell into one of the plurality of categories based on the adjusted score of each cell; and
determine, for each cell of the plurality of cells, the tilt range for that cell as the range of tilt values associated with the category into which the cell is classified.

18. An apparatus for determining a tilt range for each cell of a plurality of cells of a wireless cellular telecommunications network, each cell having at least one antenna, the apparatus comprising a processor configured to:
determine, for each cell of the plurality of cells, a value for each of a plurality of metrics, the plurality of metrics comprising:
a metric indicative of retainability,
a metric indicative of capacity,
a metric indicative of UL quality,
a metric indicative of DL quality, and
a cell parameter;
determine respective thresholds for each metric;
for each cell of the plurality of cells, classify the cell into one of a plurality of categories based on a comparison of the determined values of the plurality of metrics of the cell to the corresponding thresholds, wherein each category of the plurality of categories has an associated range of tilt values, and wherein when classifying each cell into one of the plurality of categories, the processor is configured to:
set an initial score for each cell;
compare the determined values of the plurality of metrics of each cell to the corresponding thresholds and adjusting the initial score of each cell based on each comparison;
classify each cell into one of the plurality of categories based on the adjusted score of each cell; and
determine, for each cell of the plurality of cells, the tilt range for that cell as the range of tilt values associated with the category into which the cell is classified.

* * * * *